US008532420B2

(12) United States Patent
Fukunishi

(10) Patent No.: US 8,532,420 B2
(45) Date of Patent: Sep. 10, 2013

(54) IMAGE PROCESSING APPARATUS, IMAGE PROCESSING METHOD AND STORAGE MEDIUM STORING IMAGE PROCESSING PROGRAM

(75) Inventor: Munenori Fukunishi, Kunitachi (JP)

(73) Assignee: Olympus Corporation, Tokyo (JP)

( * ) Notice: Subject to any disclaimer, the term of this patent is extended or adjusted under 35 U.S.C. 154(b) by 512 days.

(21) Appl. No.: 12/701,734

(22) Filed: Feb. 8, 2010

(65) Prior Publication Data

US 2010/0208944 A1 Aug. 19, 2010

(30) Foreign Application Priority Data

Feb. 13, 2009 (JP) .................................. 2009-31872

(51) Int. Cl.
*G06K 9/40* (2006.01)

(52) U.S. Cl.
USPC ........... 382/255; 382/106; 382/205; 382/260; 382/264

(58) Field of Classification Search
USPC ................. 382/103, 105, 205, 260, 294, 255, 382/106, 264
See application file for complete search history.

(56) References Cited

U.S. PATENT DOCUMENTS

| 4,918,742 | A | * | 4/1990 | Simonds | ........................ | 382/304 |
| 4,965,442 | A | * | 10/1990 | Girod et al. | ................. | 250/201.7 |
| 5,003,166 | A | * | 3/1991 | Girod | ......................... | 250/201.4 |
| 2006/0177207 | A1 | * | 8/2006 | Bang et al. | ...................... | 396/52 |
| 2006/0279639 | A1 | * | 12/2006 | Silverstein et al. | ...... | 348/208.14 |
| 2007/0065130 | A1 | * | 3/2007 | Fukumoto et al. | ............... | 396/55 |
| 2008/0181527 | A1 | * | 7/2008 | Ok et al. | ........................ | 382/255 |
| 2008/0199063 | A1 | * | 8/2008 | O'Halloran et al. | .......... | 382/131 |
| 2009/0060373 | A1 | * | 3/2009 | Perera et al. | ................... | 382/264 |
| 2009/0161977 | A1 | * | 6/2009 | Shiraki et al. | .................. | 382/255 |
| 2009/0316995 | A1 | * | 12/2009 | Szeliski et al. | ................ | 382/199 |

FOREIGN PATENT DOCUMENTS

| JP | 2006-339784 | A |   | 12/2006 |
| JP | 2006-339903 | A |   | 12/2006 |
| JP | 2007-074031 | A |   | 3/2007 |
| JP | 2007074031 |   | * | 3/2007 |

* cited by examiner

*Primary Examiner* — Jayesh A Patel
(74) *Attorney, Agent, or Firm* — Holtz, Holtz, Goodman & Chick, PC

(57) ABSTRACT

An image processing apparatus for correcting a positional deviation between a plurality of images obtained in time series and performing synthesis processing on the plurality of corrected images determines a motion vector between the plurality of images, corrects the positional deviation between images on the basis of the determined motion vector, and generates a synthesized image by synthesizing the plurality of images subjected to the positional deviation correction. The image processing apparatus extracts a filter area in which filter processing is to be performed on the basis of a degree of inconsistency occurring when the positional deviation between the plurality of images is corrected, determines a filter kernel on the basis of an imaging condition, and performs filter processing based on the filter kernel on the filter area of the synthesized image.

13 Claims, 20 Drawing Sheets

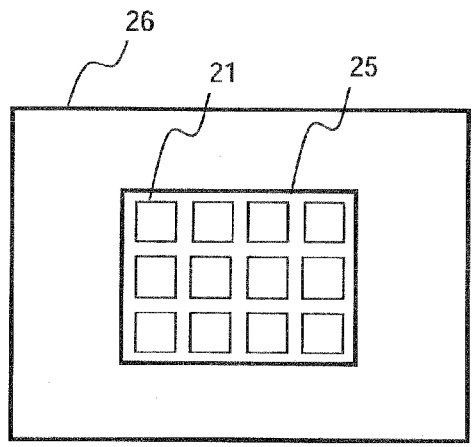
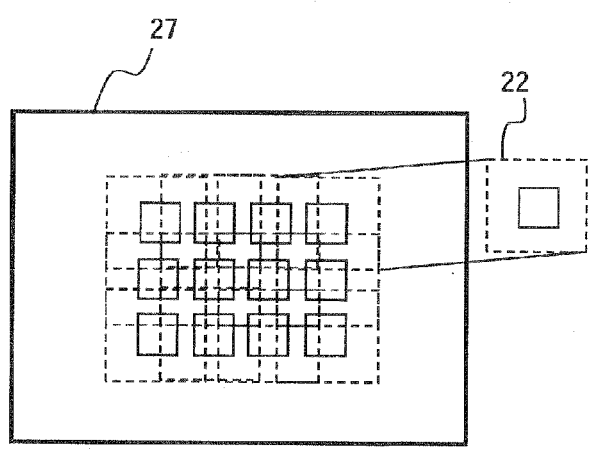
FIG.3A  FIG.3B
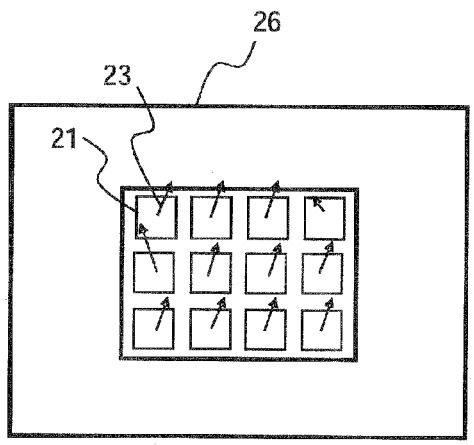
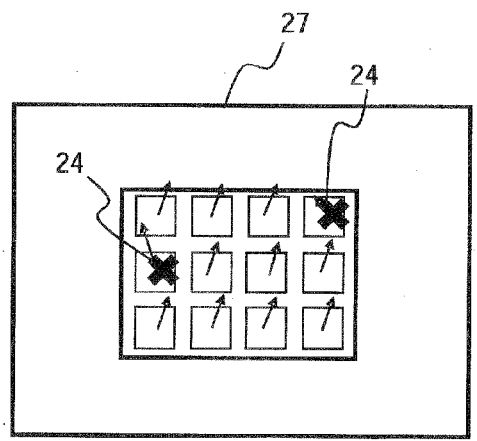
FIG.4A  FIG.4B

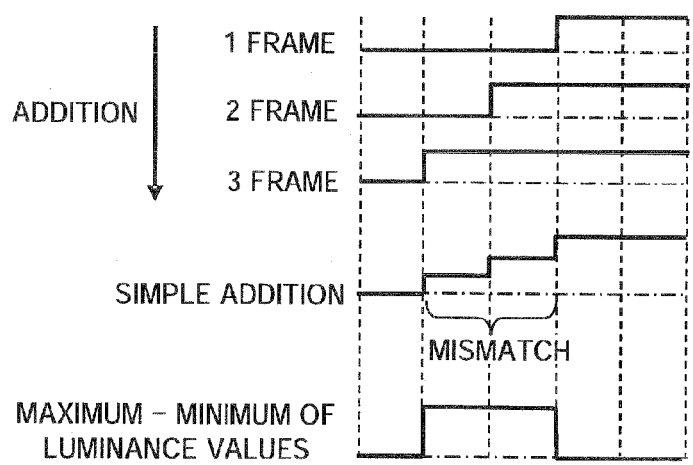
FIG.7
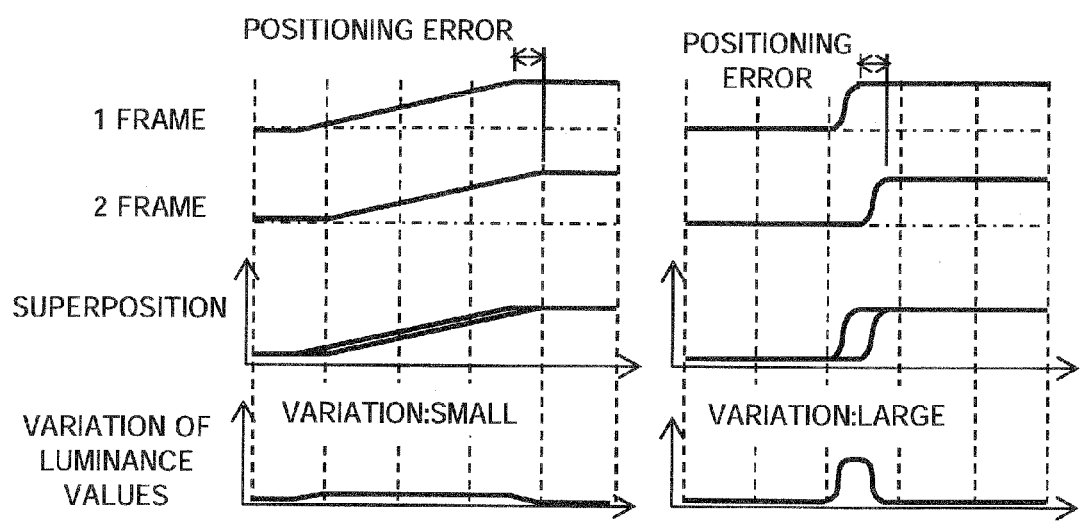
FIG.8A  FIG.8B

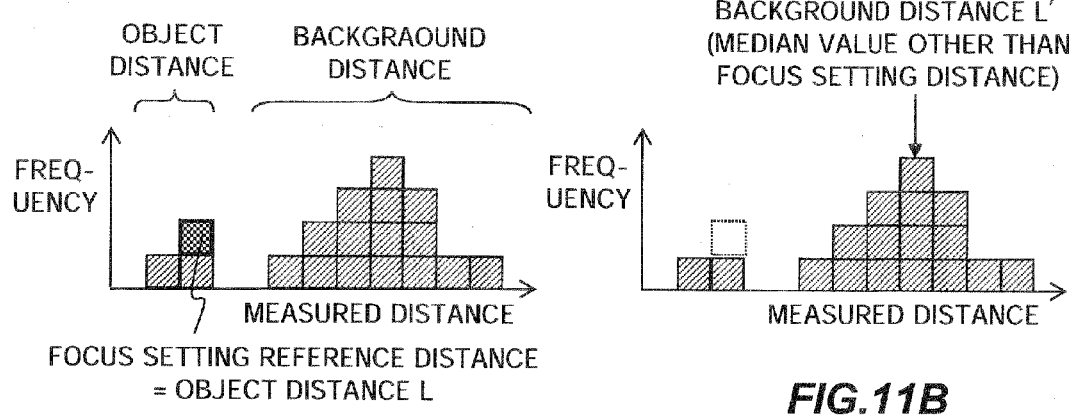
FIG.11A
FIG.11B
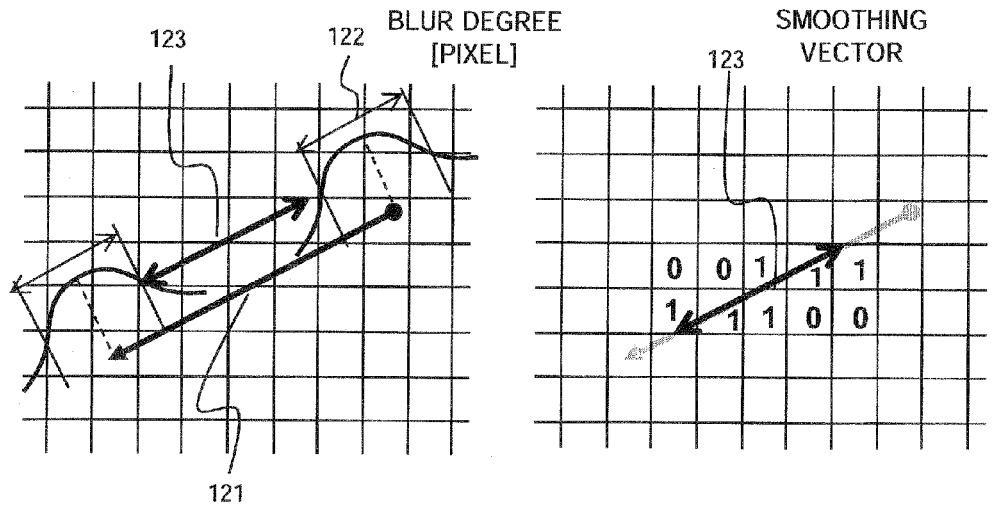
FIG.12A
FIG.12B

| BLUR DEGREE [PIXEL] | FILTER KERNEL SIZE |
|---|---|
| up to 3 | 20 |
| up to 6 | 17 |
| up to 9 | 14 |
| up to 12 | 11 |
| up to 15 | 8 |
| up to 20 | 3 |
| greater than 20 | 0 |

*FIG.13*

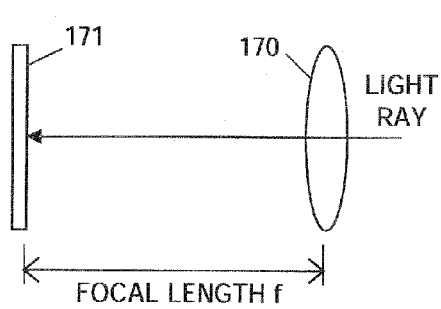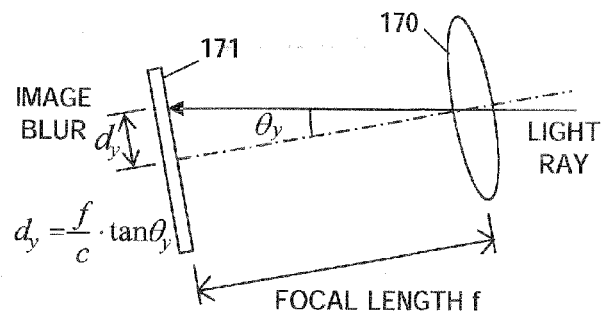
FIG.17A  FIG.17B
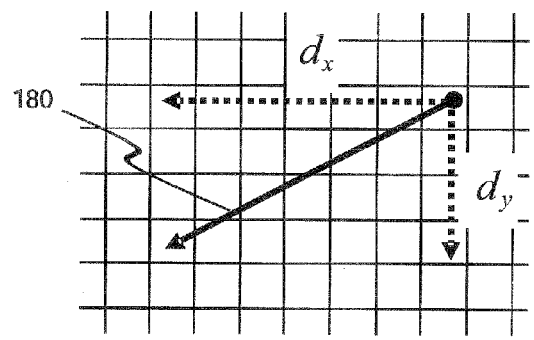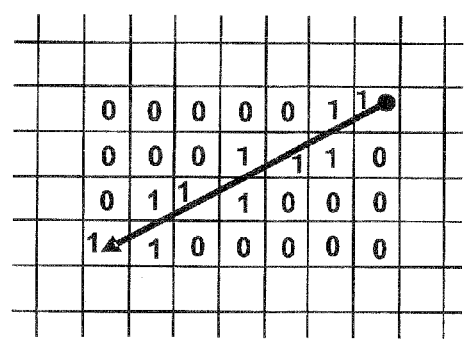
FIG.18A  FIG.18B

| BLUR DEGREE [PIXEL] | FILTER KERNEL | |
|---|---|---|
| | 1 1 1 1 1<br>1 1 1 1 1<br>1 1 1 1 1<br>1 1 1 1 1<br>1 1 1 1 1 | 1 1 1<br>1 1 1<br>1 1 1 |
| UP TO 3 | TWICE | TWICE |
| UP TO 6 | TWICE | ONCE |
| UP TO 9 | ONCE | TWICE |
| UP TO 12 | ONCE | ONCE |
| UP TO 15 | ZERO | TWICE |
| UP TO 20 | ZERO | ONCE |
| GREATER THAN 20 | ZERO | ZERO |

IMAGE PROCESSING APPARATUS, IMAGE PROCESSING METHOD AND STORAGE MEDIUM STORING IMAGE PROCESSING PROGRAM

TECHNICAL FIELD OF THE INVENTION

This invention relates to an image synthesis technique using a plurality of images captured in time series.

BACKGROUND OF THE INVENTION

During conventional camera photography, a photography technique known as a "follow shot" is used to photograph a moving object such as a train, an automobile, or a sport scene. A "follow shot" is a technique in which image pickup is performed while moving (panning) the camera in accordance with movement of the object so that an object position within a finder (an image) of the object is static. With follow shot photography, an image in which a background appears to flow but the object does not blur can be obtained, and therefore an image expressing a sense of speed can be obtained. In actuality, however, it is not easy to fix the object position within the image during image pickup (during a period in which a shutter is open and an imaging device is exposed), and therefore the object is often blurred. Methods such as sensing a movement direction of the camera during image pickup using an angular velocity sensor and suppressing a blur component in a direction that is not the movement direction of the camera by shifting an optical system or the imaging device have been employed as typical conventional methods of dealing with this problem. For example, when the camera pans in a horizontal direction, vertical direction blur is suppressed.

JP2007-074031A discloses a method in which an image area is divided into a mesh form, the respective areas are divided into a target area and other areas using motion vectors of the respective areas, and a smoothing filter for producing a similar blur effect to that of a follow shot is applied to the part that is not the target area.

SUMMARY OF THE INVENTION

An image processing apparatus of an aspect of the present invention for correcting a positional deviation between a plurality of images obtained in time series and performing synthesis processing on the plurality of corrected images, comprises a motion vector determination unit that determines a motion vector between the plurality of images, an image synthesis unit that corrects the positional deviation between the plurality of images on the basis of the determined motion vector and generates a synthesized image by synthesizing the plurality of images subjected to the positional deviation correction, a filter area extraction unit that extracts a filter area in which filter processing is to be performed on the basis of a degree of inconsistency occurring when the positional deviation between the plurality of images is corrected, a filter kernel determination unit that determines a filter kernel on the basis of an imaging condition, and a filter processing unit that performs filter processing based on the filter kernel on the extracted filter area of the synthesized image.

An image processing apparatus of another aspect of the present invention for correcting a positional deviation between a plurality of images obtained in time series and performing synthesis processing on the plurality of corrected images, comprises a motion vector determination unit that determines a motion vector between the plurality of images, a filter area extraction unit that extracts a filter area in which filter processing is to be performed on the basis of a degree of inconsistency occurring when the positional deviation between the plurality of images is corrected, a filter kernel determination unit that determines a filter kernel on the basis of an imaging condition, a filter processing unit that performs filter processing based on the filter kernel on the extracted filter areas of the plurality of images, and an image synthesis unit that corrects the positional deviation between the plurality of images subjected to the filter processing on the basis of the determined motion vector, and generates a synthesized image by synthesizing the plurality of images subjected to the positional deviation correction.

An image processing apparatus of yet another aspect of the present invention comprises a motion vector determination unit that determines a motion vector between a plurality of images, a filter area extraction unit that extracts a filter area in which filter processing is to be performed on the basis of a degree of inconsistency occurring when positioning is performed between the plurality of images in accordance with the motion vector, a filter kernel determination unit that determines a filter kernel on the basis of an imaging condition, and a filter processing unit that performs filter processing based on the filter kernel on the extracted filter area from among respective areas of a single image.

An image processing method of yet another aspect of the present invention for correcting a positional deviation between a plurality of images obtained in time series and performing synthesis processing on the plurality of corrected images, comprises a step of determining a motion vector between the plurality of images, a step of correcting the positional deviation between the plurality of images on the basis of the determined motion vector and generating a synthesized image by synthesizing the plurality of images subjected to the positional deviation correction, a step of extracting a filter area in which filter processing is to be performed on the basis of a degree of inconsistency occurring when the positional deviation between the plurality of images is corrected, a step of deter a filter kernel on the basis of an imaging condition, and a step of performing filter processing based on the filter kernel on the extracted filter area of the synthesized image.

An image processing method of yet another aspect of the present invention for correcting a positional deviation between a plurality of images obtained in time series and performing synthesis processing on the plurality of corrected images, comprises a step of determining a motion vector between the plurality of images, a step of extracting a filter area in which filter processing is to be performed on the basis of a degree of inconsistency occurring when the positional deviation between the plurality of images is corrected, a step of determining a filter kernel on the basis of an imaging condition, a step of performing filter processing based on the filter kernel on the extracted filter areas of the plurality of images, and a step of correcting the positional deviation between the plurality of images subjected to the filter processing on the basis of the determined motion vector, and generating a synthesized image by synthesizing the plurality of images subjected to the positional deviation correction.

An image processing method of yet another aspect of the present invention comprises a step of determining a motion vector between a plurality of images, a step of extracting a filter area in which filter processing is to be performed on the basis of a degree of inconsistency occurring when positioning is performed between the plurality of images in accordance with the motion vector, a step of determining a filter kernel on the basis of an imaging condition, and a step of performing filter processing based on the filter kernel on the extracted filter area from among respective areas of a single image.

A recording medium of yet another aspect of the present invention stores an image processing program for correcting a positional deviation between a plurality of images obtained in time series and performing synthesis processing on the plurality of corrected images. The image processing program causes a computer to execute a step of determining a motion vector between the plurality of images, a step of correcting the positional deviation between the plurality of images on the basis of the determined motion vector and generating a synthesized image by synthesizing the plurality of images subjected to the positional deviation correction, a step of extracting a filter area in which filter processing is to be performed on the basis of a degree of inconsistency occurring when the positional deviation between the plurality of images is corrected, a step of determining a filter kernel on the basis of an imaging condition, and a step of performing filter processing based on the filter kernel on the extracted filter area of the synthesized image.

A recording medium of yet another aspect of the present invention stores an image processing program for correcting a positional deviation between a plurality of images obtained in time series and performing synthesis processing on the plurality of corrected images. The image processing program causes a computer to execute a step of determining a motion vector between the plurality of images, a step of extracting a filter area in which filter processing is to be performed on the basis of a degree of inconsistency occurring when the positional deviation between the plurality of images is corrected, a step of determining a filter kernel on the basis of an imaging condition, a step of performing filter processing based on the filter kernel on the extracted filter areas of the plurality of images, and a step of correcting the positional deviation between the plurality of images subjected to the filter processing on the basis of the determined motion vector, and generating a synthesized image by synthesizing the plurality of images subjected to the positional deviation correction.

A recording medium of yet another aspect of the present invention stores an image processing program. The image processing program causes a computer to execute a step of determining a motion vector between a plurality of images, a step of extracting a filter area in which filter processing is to be performed on the basis of a degree of inconsistency occurring when positioning is performed between the plurality of images in accordance with the motion vector, a step of determining a filter kernel on the basis of an imaging condition, and a step of performing filter processing based on the filter kernel on the extracted filter area from among respective areas of a single image.

BRIEF DESCRIPTION OF THE DRAWINGS

FIG. 3A is a view showing a processing area of the positioning processing performed on a reference frame, and FIG. 3B is a view showing a processing area of the positioning processing performed on a positioning subject frame.

FIG. 4A is a view showing an example of motion vectors of respective template blocks, and FIG. 4B shows reliable motion vectors remaining after unreliable motion vectors have been excluded.

FIG. 7 shows, in descending order, a luminance value of an image of a first frame, a luminance value of an image of a second frame, a luminance value of an image of a third frame, a total luminance value of the images of the first to third frames, and a difference between a maximum value and a minimum value of the luminance values of the images of the first to third frames.

FIGS. 8A and 8B show, in descending order, the luminance value of the image of the first frame, the luminance value of the image of the second frame, a luminance value obtained when the image of the first frame and the image of the second frame are overlapped, and a difference between the luminance values of the image of the first frame and the image of the second frame.

FIG. 11A is a view illustrating a method of calculating the object distance L, and FIG. 11B is a view illustrating a method of calculating the background distance L'.

FIGS. 12A and 12B are views illustrating a method of generating a smoothing filter kernel.

FIG. 13 shows an example of a table defining the relationship between the degree of blur D and the size of the filter kernel.

FIGS. 17A and 17B are views showing a relationship between a shake angle of the camera and image blur.

FIGS. 18A and 18B are views illustrating a method of generating the smoothing filter kernel in the second embodiment.

DESCRIPTION OF THE PREFERRED EMBODIMENTS

First Embodiment

Figure 1:
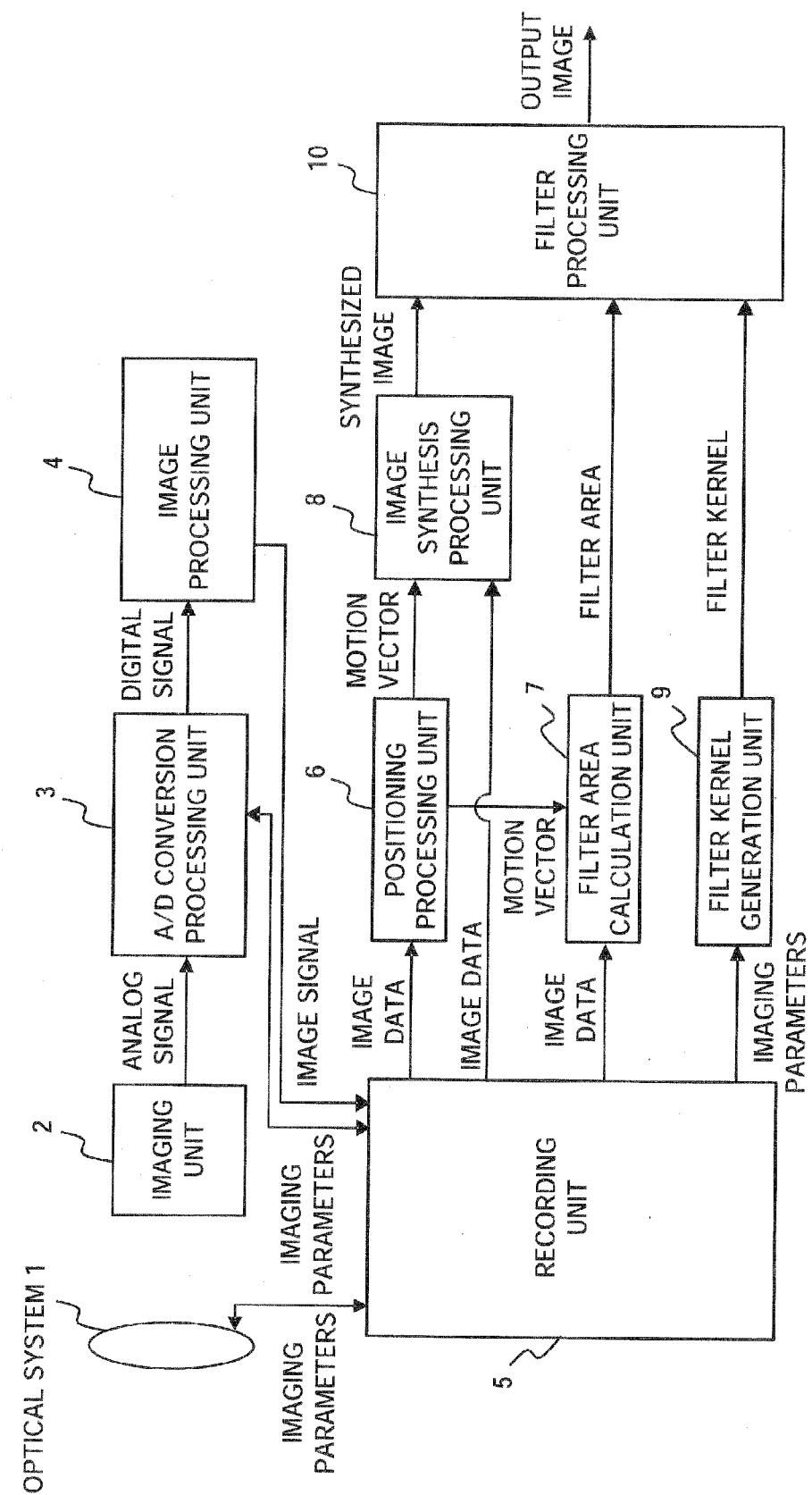
FIG. 1 is a view showing the constitution of an image processing apparatus according to a first embodiment of this invention.

FIG. 1 is a view showing the constitution of an image processing apparatus according to a first embodiment of this invention. In the drawing, arrows indicate the flow of data. The image processing apparatus according to this embodiment is installed in an electronic device that is dependent on a current or an electromagnetic field to operate correctly, such as a digital camera, a digital video camera, or an endoscope.

Imaging parameters such as a focal length, a shutter speed, an aperture value (F value), and a focus setting parameter (object distance) are recorded in advance in a recording unit 5. These imaging parameters are set in an optical system 1. Imaging parameters such as an ISO sensitivity (A/D conversion gain) are also recorded in the recording unit 5, and the imaging parameters such as the ISO sensitivity are set in an A/D conversion processing unit 3.

Light taken in by the optical system 1 is converted into an electric signal by an imaging unit 2 and output as an analog signal. The A/D conversion processing unit 3 converts the analog signal output by the imaging unit 2 into a digital signal. An image processing unit 4 performs noise removal processing, demosaicing processing (processing for allocating three values of RGB to each pixel from a state in which only one signal of RGB signals exists in each pixel), and the like on the digital signal to convert the digital signal into an image signal. The image signal is accumulated in the recording unit 5. The data flow series up to this point is executed each time image pickup is performed.

During continuous shooting, the data flow described above is executed for each of the continuous shots. Further, every time the imaging parameters set in the optical system 1 and the A/D conversion processing unit 3 are modified, the modified parameters are updated/held in the recording unit 5.

A positioning processing unit 6 determines an inter-image data motion vector (positional deviation) on the basis of data relating to the plurality of images accumulated in the recording unit 5. An image synthesis processing unit 8 performs synthesis processing on the data relating to the plurality of images on the basis of the data relating to the plurality of images and the motion vector, and outputs a synthesized image.

A filter area calculation unit 7 determines a filter area within the synthesized image on the basis of the data relating to the plurality of images and the motion vector. A filter kernel generation unit 9 determines a filter kernel on the basis of the imaging parameters. A filter processing unit 10 executes filter processing on the synthesized image on the basis of the filter kernel and the filter area, and obtains an output image.

Figure 2:
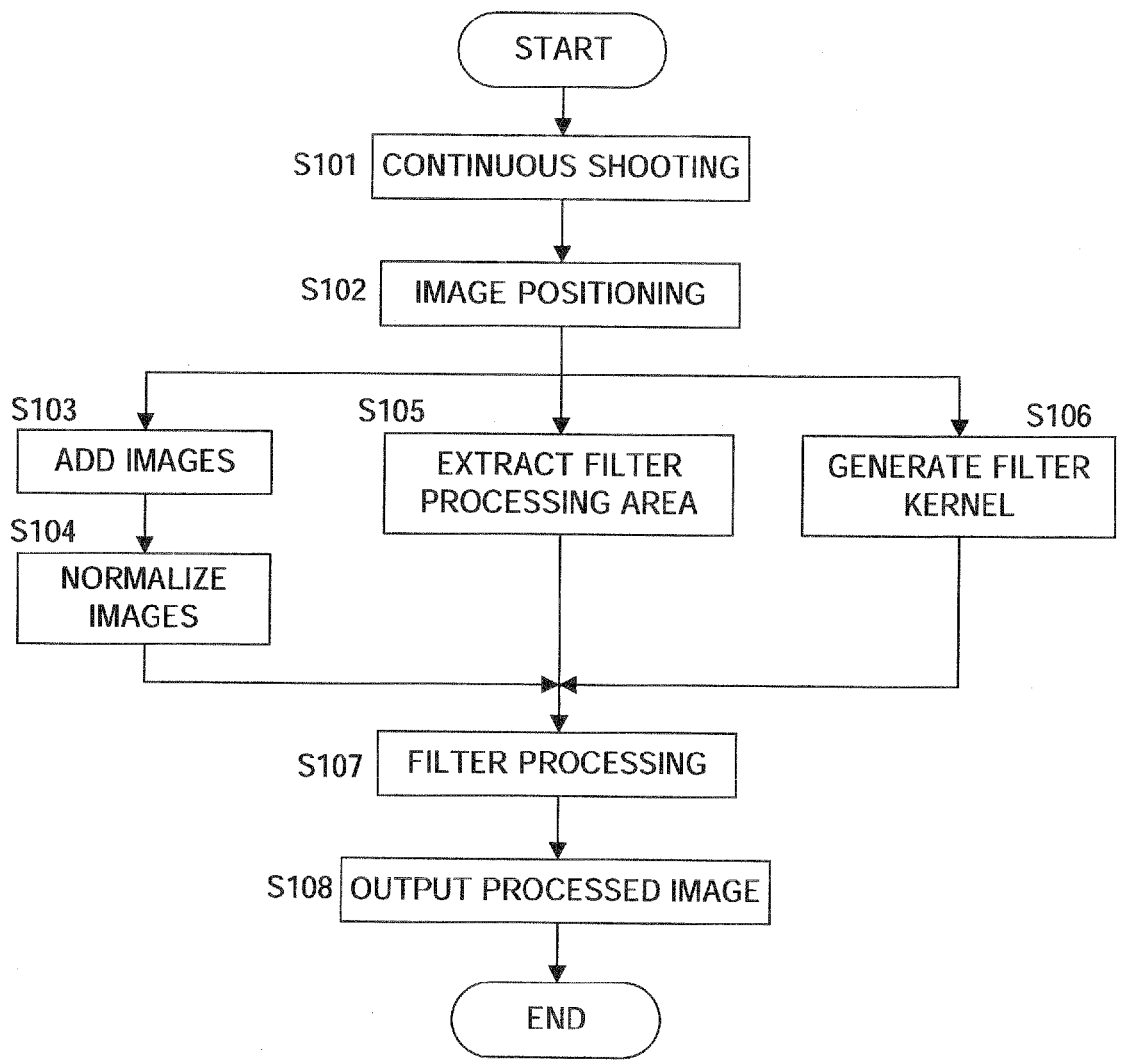
FIG. 2 is a flowchart showing an overall processing flow executed by the image processing apparatus according to the first embodiment.

FIG. 2 is a flowchart showing an overall processing flow executed by the image processing apparatus according to the first embodiment.

In a step S101, the imaging unit 2 performs continuous shooting to obtain a plurality of images that are continuous in time series. The obtained plurality of images are processed by the A/D conversion processing unit 3 and the image processing unit 4, respectively, and then recorded in the recording unit 5.

In a step S102, positioning processing is performed by the positioning processing unit 6 using the plurality of images recorded in the recording unit 5, whereby a motion vector indicating positional deviation between the images is determined. Hereafter, an image that serves as a positioning reference will be referred to as a reference frame and an image that is positioned relative to the reference frame will be referred to as a positioning subject frame (or a subject frame). The reference frame is set using any one of the continuous images as a positioning reference coordinate system. The positioning subject frame is set by setting images other than the reference frame in sequence. For example, when a first frame is set as the positioning reference, the second and subsequent frames are set as the positioning subject frame. In the positioning processing, a movement amount of an image in the second frame onward from the first frame is calculated.

FIGS. 3A and 3B are views showing a processing area of the positioning processing performed on the reference frame and the positioning subject frame. As shown in FIG. 3A, a plurality of positioning template blocks 21 are set within a predetermined area 25 in a central part of a positioning subject frame 26. The template blocks 21 are rectangular areas of a predetermined size, which are used to determine the motion vector.

FIG. 3B is a view showing search areas 22 set in the reference frame 27. The search areas 22 are set in the reference frame 27 in a wider area than the template blocks 21 and in the vicinity of coordinates corresponding to the template blocks 21.

During motion vector calculation, an alignment index indicating a degree of position overlap is calculated by scanning the template block 21 in the positioning subject frame 26 within the search area 22 of the reference frame 27. A position in which the alignment index is largest (or smallest, depending on the type of the alignment index) is set as a positioning correspondence point, and a relative positional deviation from the template block 21 is set as the motion vector. A SAD (Sum of Absolute intensity Difference), for example, which is the sum of absolute values of an inter-frame luminance difference, may be used as the alignment index. The degree of alignment is determined to be greater as the SAD decreases. When a pixel included in a template block area I of the reference frame 27 is set as p (p∈I), a pixel included in a positioning processing area I' of the positioning subject frame 26 is q (q∈I'), and luminance values are set as Lp, Lq respectively, SAD is obtained from a following Equation (1).

$$SAD(I, I') = \sum_{p \in I, q \in I'} \|L_p - L_q\|_1 \tag{1}$$

Alternatively, an SSD (Sum of Squared intensity Difference), in which a squared error is calculated, an NCC (Normalized Cross-Correlation), in which a normalized cross-correlation is calculated, and so on may be used as the alignment index. By employing the procedures described above, a motion vector can be determined for each of the template blocks 21 shown in FIG. 3A.

FIG. 4A is a view showing examples of motion vectors 23 of the respective template blocks 21. The motion vectors of the respective template blocks 21 determined by the method described above include reliable and unreliable motion vectors. For example, in a low-contrast area lacking positioning clues, the reliability of the motion vector is low. In a high-contrast area, on the other hand, a highly reliable result is more likely to be obtained.

Hence, using contrast information relating to each template block 21, the reliability of the motion vector 23 of each block is determined, whereupon unreliable motion vectors, or in other words motion vectors of low-contrast areas, are excluded from subsequent calculations. FIG. 4B shows reliable motion vectors remaining after unreliable motion vectors 24 have been excluded.

Figure 5:
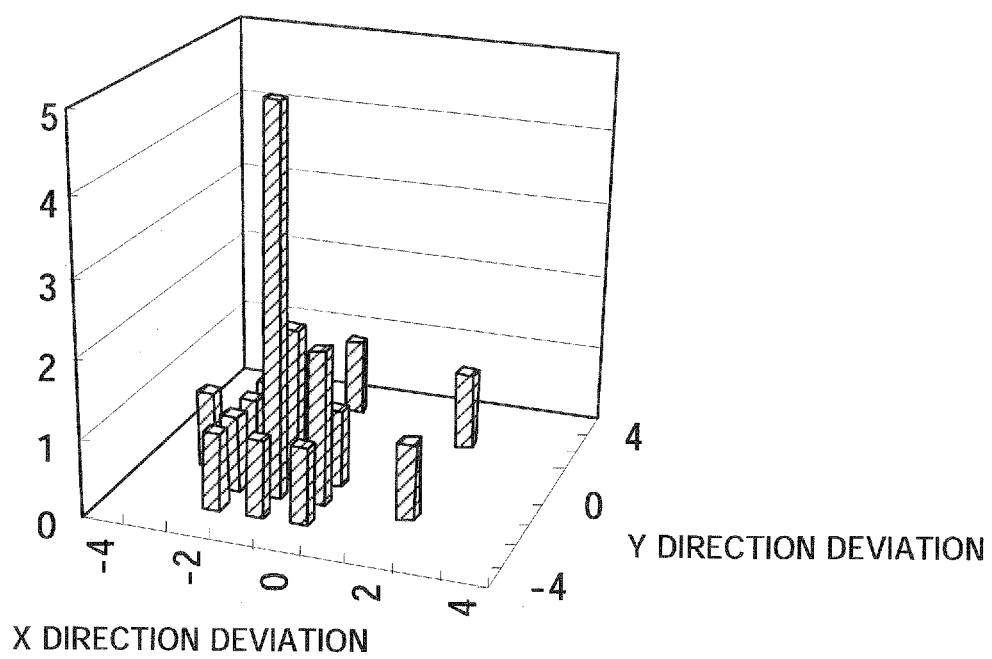
FIG. 5 is a view showing examples of voting processing results obtained in relation to reliable motion vectors on a histogram.

Next, voting processing is performed on the remaining reliable motion vectors to select a most frequent motion vector, or in other words a most numerous motion vector. FIG. 5 is a view showing examples of voting processing results obtained in relation to reliable motion vectors on a histogram. The most frequent motion vector is determined by breaking down the reliable motion vectors into an X direction deviation and a Y direction deviation and then performing voting processing. The most frequent motion vector is set as a representative motion vector between the reference frame and the positioning subject frame.

As described above, in this embodiment, the motion vector is detected in the predetermined area 25 in the central part of the image. The reasons for this are that a main object is assumed to be in the central part of the image and the majority of main objects are located in the central part of the image. It should be noted that with this method, although the main object may be in the central part of a screen at the start of continuous shooting, the main object may move so as to deviate from the central part of the screen. In response to this problem, a first positioning operation may be performed in the central portion of the image, whereupon second and subsequent positioning operations are performed in the vicinity of a motion vector obtained from a previous positioning result.

In a step S103 of the flowchart shown in FIG. 2, the image synthesis processing unit 8 adds together the plurality of images while correcting positional deviation between the images on the basis of the motion vector deter in the step S102. In a step S104, the image synthesis processing unit 8 normalizes the added images by an addition count to obtain a synthesized image.

In a step S105, the filter area calculation unit 7 extracts a filter area on the basis of the data relating to the plurality of images and the motion vector. When continuously photographed images are positioned using an object reference, unnatural bumps in level are generated in a background part of the synthesized image. The processing of the step S105 is performed with the aim of extracting a processing area in which filter processing for reducing these bumps in level is to be performed.

Figure 6:
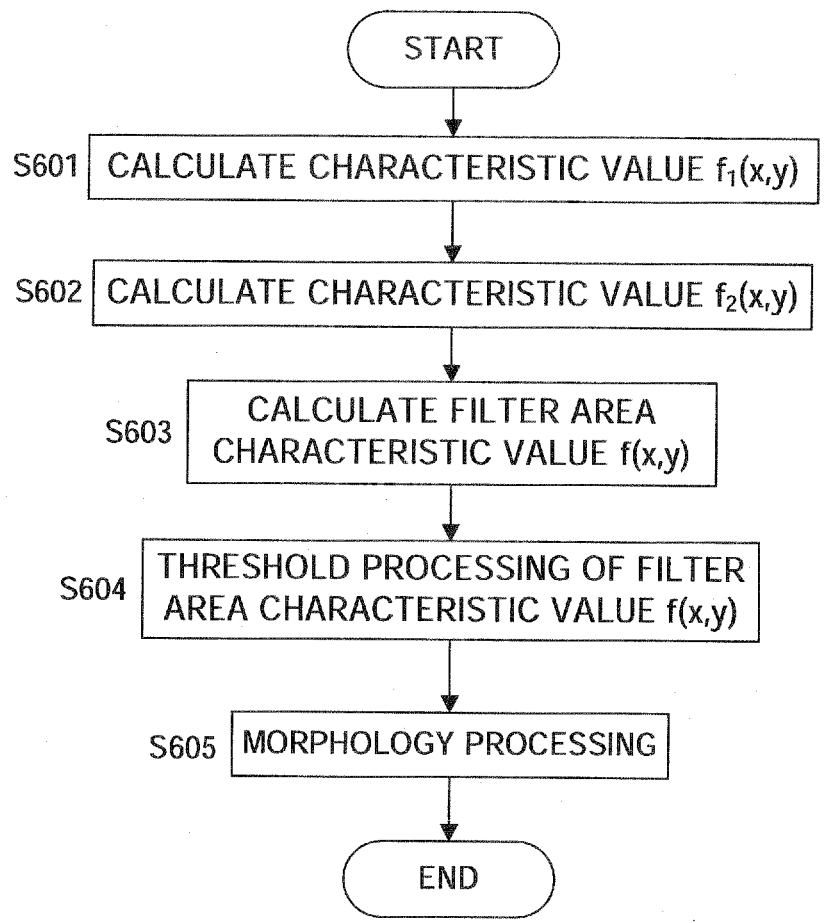
FIG. 6 is a flowchart showing a processing flow of filter area extraction processing.

FIG. 6 is a flowchart showing a processing flow of filter area extraction processing performed in the step S105 of FIG. 2. In a step S601, a first characteristic value $f_1$ (x, y) representing positioning inconsistency between the images of the synthesized image is calculated. A method of calculating the first characteristic value $f_1$ (x, y) will now be described using FIG. 7.

FIG. 7 shows, in descending order, a luminance value of an image of a first frame, a luminance value of an image of a second frame, a luminance value of an image of a third frame, a total luminance value of the images of the first to third frames, and a difference between a maximum value and a minimum value of the luminance values of the images of the first to third frames.

In the synthesized image, the object is positioned to the reference, and therefore, in the object part, images having substantially identical luminance values are added together. In the background part, on the other hand, images having different luminance values are added together, and this leads to bumps in level in the background part of the synthesized image (see FIG. 7).

Hence, a degree of variation between the luminance values of the added images is determined as the first characteristic value $f_1$ (x, y). More specifically, a difference between the luminance values of the respective positioned images is defined as the first characteristic value $f_1$ (x, y) and determined using a following Equation (2). In Equation (2), N is the number of added images, (Vx (n), Vy (n)) is the motion vector of an nth image, and $I_n$ (x, y) is the luminance value in a pixel (x, y) of the nth image.

$$f_1(x, y) = \max_{n \in N}(I_n(x + Vx(n), y + Vy(n))) - \min_{n \in N}(I_n(x + Vx(n), y + Vy(n))) \quad (2)$$

In a step S602, a second characteristic value $f_2$ (x, y) indicating the effect of the positioning error on the synthesized image is calculated. A method of calculating the second characteristic value $f_2$ (x, y) will now be described using FIGS. 8A and 8B.

FIGS. 8A and 8B show, in descending order, the luminance value of the image of the first frame, the luminance value of the image of the second frame, a luminance value obtained when the image of the first frame and the image of the second frame are overlapped, and a difference (variation) between the luminance values of the image of the first frame and the image of the second frame FIG. 8A shows an example of a case in which a positioning error exists when the two images are overlapped but the luminance value difference caused by the positioning error is small, and FIG. 8B shows an example of a case in which the luminance value difference caused by the positioning error is large.

During actual positioning processing, a positioning error occurs. The second characteristic value $f_2$ (x, y) is used to cancel out adverse effects caused by the positioning error. With the first characteristic value $f_1$ (x, y), a luminance value difference is calculated, but when a positioning error exists, the luminance value difference varies. In an area where a luminance gradient, i.e. the degree of variation in the luminance value, is small, the effect of the positioning error on the luminance value difference is small (see FIG. 8A). In an area where the luminance gradient is large, on the other hand, variation in the luminance value difference increases even when the positioning error remains the same (see FIG. 8B). To eliminate this effect, the variation applied to the luminance difference by the positioning error is determined as the second characteristic value $f_2$ (x, y) using a following Equation (3).

$$f_2(x, y) = \alpha \cdot \left\{ \max_{-1 \leq i \leq 1, -1 \leq j \leq 1}(I_0(x + i, y + j)) - \min_{-1 \leq i \leq 1, -1 \leq j \leq 1}(I_0(x + i, y + j)) \right\} \quad (3)$$

In Equation (3), α is an image positioning precision in pixel units, and $I_0$ (x, y) is the luminance value of the pixel (x, y) in the reference image. An arbitrary image from among the N added images, such as a leading image or an intermediate image, for example, may be set as the reference image. It should be noted that in normal positioning processing, the positioning precision α may be learned in advance through analysis. Here, terms other than α in Equation (3) indicate a worst value of the luminance variation when positioning deviates by a single pixel. By multiplying the worst value by the positioning precision α, luminance variation caused by the positioning error can be determined in each location of the image.

In a step S603, a filter area characteristic value f (x, y) is determined on the basis of the first characteristic value $f_1$ (x, y) determined in the step S601 and the second characteristic value $f_2$ (x, y) determined in the step S602 using a following Equation (4).

$$f(x,y) = f_1(x,y) - f_2(x,y) \quad (4)$$

In a step S604, threshold processing is performed to compare the filter area characteristic value f (x, y) determined in the step S603 with a predetermined threshold Th. When the filter area characteristic value f (x, y) is equal to or greater than the predetermined threshold Th, Area (x, y)=1 is set, and when the filter area characteristic value f (x, y) is smaller than the predetermined threshold Th, Area (x, y)=0 is set. In other words, a relationship shown in a following Equation (5) is established. An area in which Area (x, y)=1 is set as the filter area in which the filter processing is performed.

$$\text{Area}(x, y) = \begin{cases} 1(f(x, y) \geq Th) \\ 0(f(x, y) < Th) \end{cases} \quad (5)$$

In a step S605, the filter area is determined by performing well known morphology processing (closing processing) on the area in which Area (x, y)=1. The area in which Area (x, y)=1 obtained in the step S604 may be divided into very small areas, and this processing is performed to connect these very small areas.

It should be noted that in the processing (the step S601) for calculating the first characteristic value $f_1$ (x, y), description focused on the difference between the maximum value and minimum value of the luminance value. However, an absolute value of the difference between the maximum value and minimum value of the luminance value, a luminance value dispersion, a standard deviation of the luminance value, a hue difference, an absolute value of the hue difference, a hue dispersion, a standard deviation of the hue, a chroma difference, an absolute value of the chroma difference, a chroma dispersion, a standard deviation of the chroma, and so on may be used instead. In this case, similar effects can be obtained in the processing (the step S602) for calculating the second characteristic value $f_2$ (x, y) by determining the variation in the luminance value, hue, or chroma caused by positional deviation.

It should be noted that here, a method of extracting a positioning inconsistency area of the background portion using a plurality of images was described. However, a user may specify the filter area.

In a step S106 of the flowchart shown in FIG. 2, the filter kernel generation unit 9 determines a filter kernel on the basis of the imaging parameters. As described above, when positioning is performed using an object reference, unnatural bumps in level are generated in the background part of the synthesized image due to positioning inconsistency. The step S106 is performed with the aim of generating a filter kernel for reducing these bumps in level. Here, a directional smoothing filter is generated so that a follow shot effect is obtained.

A feature of the processing performed in the step S106 is that a filter kernel with which a degree of smoothing is modified in accordance with imaging conditions is generated. For example, when a depth of field is deep, the background is captured clearly, and therefore positioning inconsistency is conspicuous when positioning is performed. Accordingly, the degree of smoothing applied to the background area is increased. When the depth of field is shallow, on the other hand, background blur occurs, and therefore positioning inconsistency is inconspicuous. Hence, the degree of smoothing is reduced.

Figure 9:
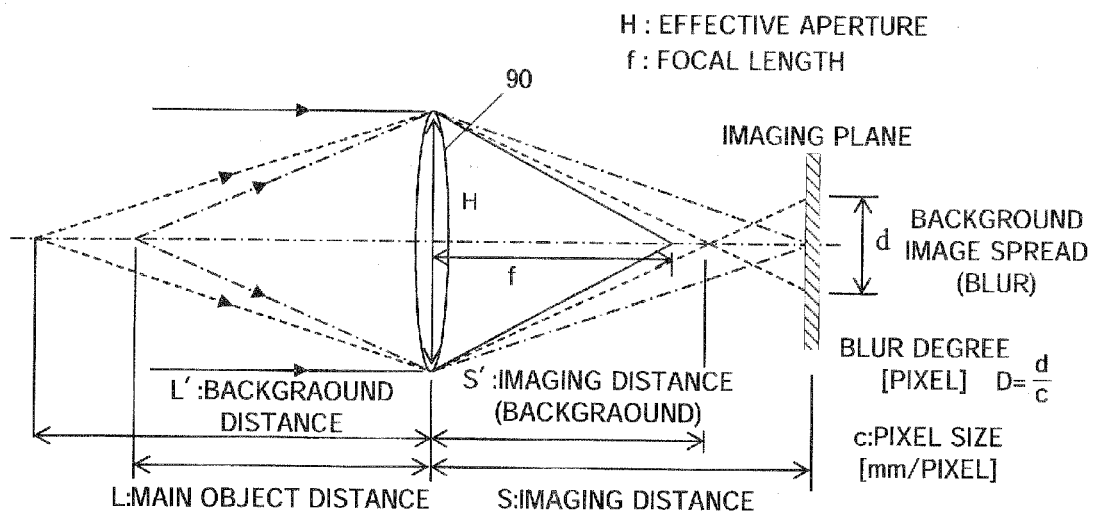
FIG. 9 shows a relationship between the imaging conditions and background blur.

FIG. 9 shows a relationship between the imaging conditions and background blur. A relationship shown in a following Equation (6) is established between a main object distance L, an imaging distance S, and a focal length f in accordance with an imaging formula of a lens 90.

$$\frac{1}{L} + \frac{1}{S} = \frac{1}{f} \Leftrightarrow S = \frac{L \cdot f}{L - f} \quad (6)$$

A pixel unit image spread D on the image can be expressed by a following Equation (7), taking into consideration that a similar relationship is established between an imaging distance S' and the focal length f in relation to a background distance L', and a relationship of f>>(S−S') is established. It should be noted that in Equation (7), F denotes an F value (aperture value: F=f/H) of the lens 90, c denotes a pixel size [mm/pixel], and d denotes a spread (blur) of background light, as shown in FIG. 9. H is an effective aperture of the lens 90.

$$D = \frac{d}{c} \cong (S - S')\frac{H}{f} \cdot \frac{1}{c} \Leftrightarrow D \cong \frac{f^2(L' - L)}{c \cdot F \cdot (L - f)(L' - f)} \quad (7)$$

Here, D determined by Equation (7) is defined as a degree of blur. As the degree of blur D increases, image blur increases, and as the degree of blur D decreases, image blur decreases. The degree of blur D can be determined by obtaining values of the focal length f, the F value F, the object distance L, and the background distance L' in accordance with the imaging condition. The focal length f and the F value F can be obtained from the imaging parameters recorded in the recording unit 5. The object distance L and the background distance L' are determined using focus setting data.

Figure 10:
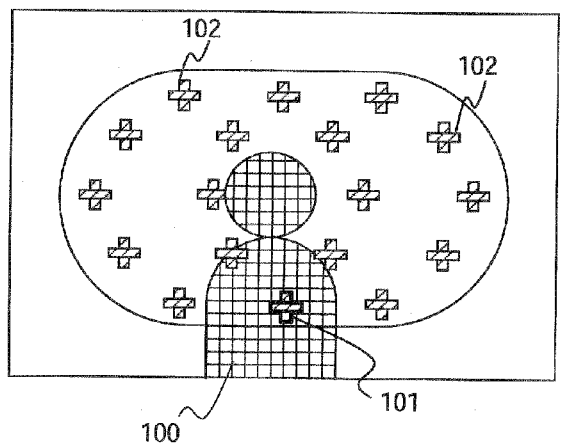
FIG. 10 is a view illustrating a method of determining an object distance L and a background distance L'.

FIG. 10 is a view illustrating a method of determining the object distance L and the background distance L'. FIG. 10 shows a person 100 photographed by the camera and a plurality of distance measurement points 101, 102. Of the plurality of distance measurement points, distance measurement points serving as focus setting references are set as the distance measurement points 101 and the other distance measurement points are set as the distance measurement points 102.

As shown in FIG. 10, during normal camera photography, a plurality of distance measurement points are set and focus setting is performed on the basis of a measurement result relating to one of the distance measurement points. An output of the distance measurement point 101 used in the focus setting is set as the object distance L. Further, a median value of distances measured using the distance measurement points 102 other than the distance measurement point 101 serving as the focus setting reference is set as the background distance L'

FIG. 11A is a view illustrating a method of calculating the object distance L. FIG. 11B is a view illustrating a method of calculating the background distance L'. In FIGS. 11A and 11B, the abscissa shows a measured distance and the ordinate shows a frequency.

As described above, the output of the distance measurement point 101 used during focus setting is set as the object distance L. However, when a plurality of distance measurement results are obtained at the distance measurement point 101, a most frequent distance is set as the object distance L, as shown in FIG. 11A.

Further, as described above, a median value of the distances measured using the distance measurement points 102 other than the distance measurement point 101 serving as the focus setting reference is set as the background distance L'. In other words, as shown in FIG. 11B, a value positioned in the center when the distances measured at the distance measurement points 102 other than the distance measurement point 101 serving as the focus setting reference are arranged in ascending order is set as the background distance L'.

Hence, by determining the object distance L and the background distance L' and obtaining the focal length f and the F value F from the imaging parameters recorded in the recording unit 5 in this manner, the degree of blur D can be determined from Equation (7).

A method of determining the filter kernel on the basis of the determined degree of blur D will now be described using FIGS. 12A and 12B. FIG. 12A shows a degree of blur D122 indicating image spread on the image and a motion vector 121 of the object determined in the step S102. The motion vector of the object and a flow condition of the background are considered to have an approximately inverse vector relationship. When the motion vector is large, positioning inconsistency in the background part increases, and therefore the degree of smoothing must be increased.

On the other hand, when the degree of background blur is large, positioning inconsistency is inconspicuous even if background deviation (the motion vector) remains the same. Conversely, when the degree of blur is small, positioning inconsistency becomes conspicuous. In consideration of these points, the filter kernel is determined on the basis of the motion vector and the degree of blur D in the background area. First, a vector 123 having a length that is reduced in proportion to the magnitude of the degree of blur D122 will be considered in relation to the motion vector 121. Using this vector 123, a directional smoothing filter of a kernel corresponding to the vector length is generated in the direction of the vector (see FIG. 12B). It is assumed in FIG. 12B that during photography, the object moves with a linear uniform motion, and therefore kernels having an identical filter factor are generated.

It should be noted that when the size of the motion vector is not taken into account and instead, the degree of blur D is calculated from a table defining the relationship between the degree of blur D and the size of the filter kernel, a directional smoothing filter corresponding to the size of the filter kernel held in the table may be generated in the motion vector direction. FIG. 13 shows an example of a table defining the relationship between the degree of blur D and the size of the filter kernel. As shown in FIG. 13, the size of the filter kernel decreases as the degree of blur D increases.

Returning to the flowchart shown in FIG. 2, in a step S107, the filter processing unit 10 performs filter processing on the basis of the synthesized image obtained through the processing of the step S104, the filter area obtained through the processing of the step S105, and the filter kernel obtained through the processing of the step S106. More specifically, smoothing processing is performed on the luminance values of the pixels within the filter area obtained through the processing of the step S105, from among the luminance values of the respective pixels constituting the synthesized image obtained through the processing of the step S104, using the filter kernel obtained through the processing of the step S106.

In a step S108, the filter processing unit 10 outputs the image obtained in the step S107.

Figure 14:
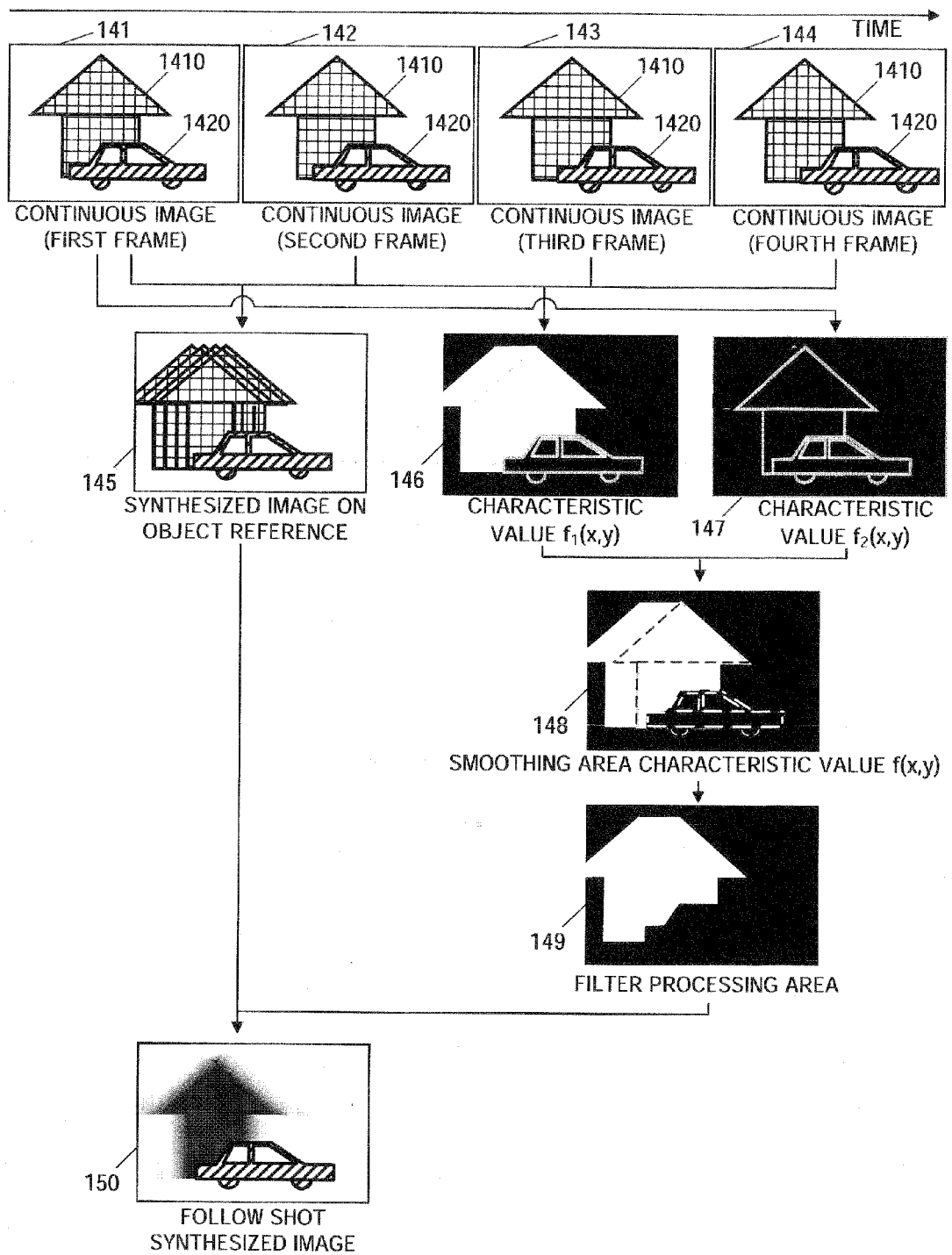
FIG. 14 is a view illustrating a procedure of generating a follow shot image from four images.

Effects and characteristics of this processing series will now be described using FIG. 14. FIG. 14 shows an example in which a synthesized image is generated using images 141 to 144 obtained by shooting four frames continuously. Each of the images 141 to 144 shows a house 1410 that does not move on the image and a moving vehicle 1420.

An image 145 is a synthesized image obtained by positioning the images 141 to 144 using the vehicle 1420, which serves as a main object, as a reference. When continuous images are positioned and synthesized using a moving object as a reference, an image in which bumps in level occur in the background part is obtained. The first characteristic value $f_1$ (x, y) takes a large value in a part of the background part and near edges of the object part (see image 146). The second characteristic value $f_2$ (x, y) takes a large value near the edges (see image 147). By determining a difference between the first characteristic value $f_1$ (x, y) and the second characteristic value $f_2$ (x, y), the filter area characteristic value f (x, y) is determined (see image 148), and by performing threshold processing, the filter area is obtained (see image 149).

As shown by the image 149 in FIG. 14, when this processing is performed, the reference object part (the vehicle 1420) is not included in the filter area (a white area), and therefore the positioning inconsistency area in the background can be extracted alone as the filter area. By performing filter processing (smoothing processing) in the filter area, a follow shot image is obtained. At this time, the filter kernel is set taking the imaging conditions into account. More specifically, under imaging conditions in which bumps in level are likely to occur in the background, the effect of the smoothing filter is strengthened such that the bumps in level in the background can be suppressed and a natural follow shot image can be generated. Under imaging conditions in which image blur occurs in the background, on the other hand, the effect of the smoothing filter is weakened such that a reduction in calculation cost can be achieved. As a result, a natural follow shot image can be obtained with stability using a plurality of images obtained through comparatively low-speed continuous photography.

With the image processing apparatus according to the first embodiment described above, an image processing apparatus that corrects positional deviation between a plurality of images obtained in time series and performs synthesis processing on the plurality of corrected images, wherein a motion vector between a plurality of images is determined, a positional deviation between the plurality of images is corrected on the basis of the determined motion vector, and a single synthesized image is generated by synthesizing the plurality of images subjected to positional deviation correction, can be provided. Further, a filter area for performing filter processing is extracted on the basis of a degree of inconsistency following correction of the positional deviation between the plurality of images, a filter kernel is determined on the basis of an imaging condition, and filter processing based on the filter kernel is performed in relation to the filter area of the generated synthesized image. By performing filter processing based on the filter kernel determined in accordance with the imaging condition, a natural synthesized image corresponding to the imaging condition can be generated.

In particular, the filter kernel is determined on the basis of at least one of a focal length, an F value, an object distance, and a background distance upon acquisition of the plurality of images, and therefore a natural synthesized image corresponding to the imaging condition can be generated appropriately.

Second Embodiment

In the image processing apparatus according to the first embodiment, the filter kernel is determined in accordance with the imaging parameters. In an image processing apparatus according to a second embodiment, the filter kernel is determined in accordance with an output of an angular velocity sensor and the imaging parameters. In this embodiment, it is assumed that a photographer performs panning for obtaining a follow shot image such that the object is approximately in the center of the image. When very small positional deviation of the object is corrected through image processing, the object becomes less likely to blur, and therefore a follow shot can be obtained easily. It is also assumed that the background flow is oriented in an opposite direction to camera movement measured by the angular velocity sensor.

Figure 15:
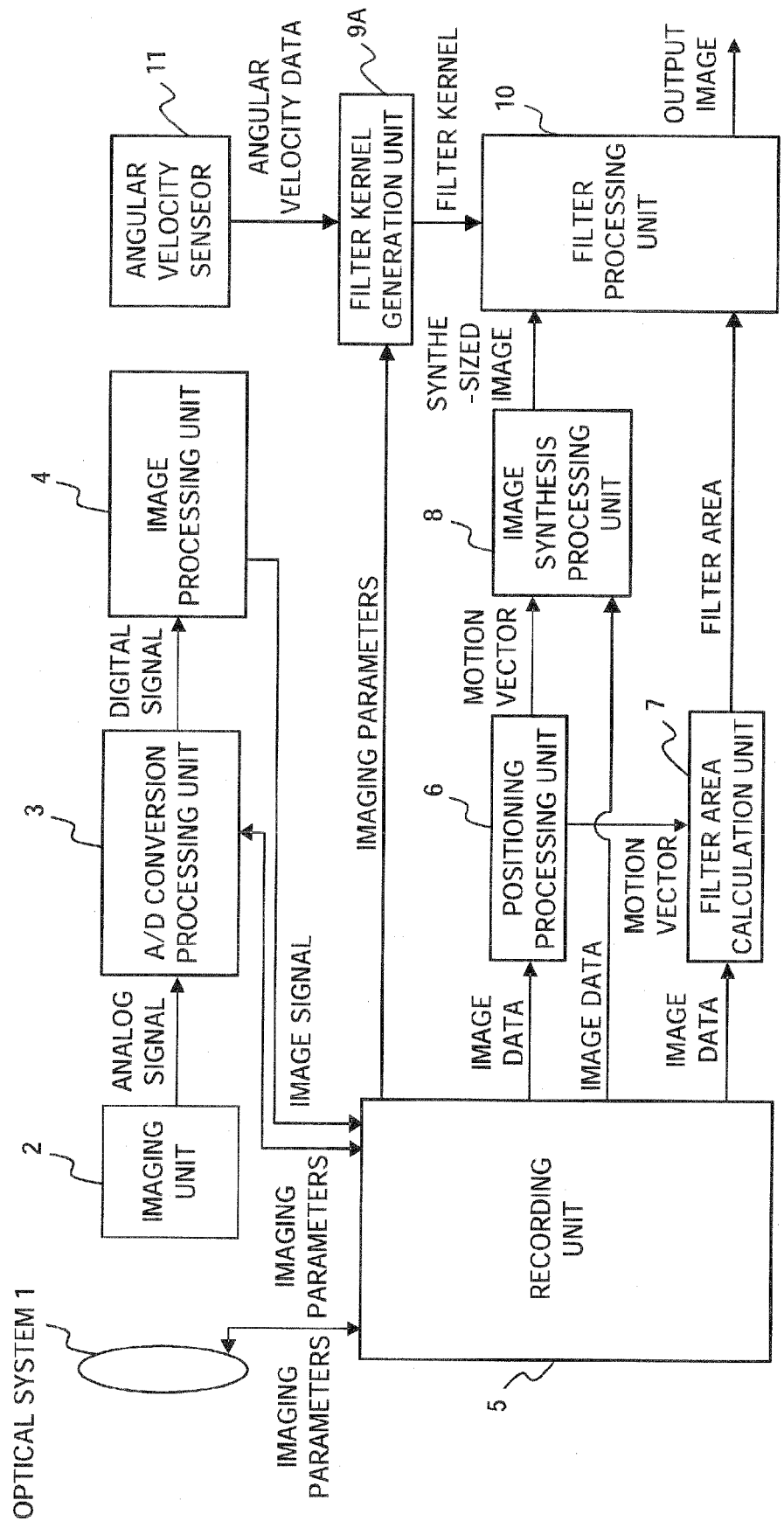
FIG. 15 is a view showing the constitution of an image processing apparatus according to a second embodiment.

FIG. 15 is a view showing the constitution of the image processing apparatus according to the second embodiment. The image processing apparatus according to the second embodiment differs from the image processing apparatus according to the first embodiment shown in FIG. 1 in the addition of an angular velocity sensor 11 and the method of generating a filter kernel employed by a filter kernel generation unit 9A.

The angular velocity sensor 11 measures an amount of camera shake during photography and outputs the measured amount as angular velocity data. The filter kernel generation unit 9A generates the filter kernel on the basis of the angular velocity data and the imaging parameters.

An overall processing flow performed by the image processing apparatus according to the second embodiment is identical to that of the flowchart shown in FIG. 2 except for the processing of the step S106, i.e. the processing content of the processing for generating the filter kernel. The processing content of the filter kernel generation processing according to this embodiment will be described below.

In the filter kernel generation processing, the filter kernel is generated on the basis of camera movement measured by the angular velocity sensor 11.

Figure 16A:
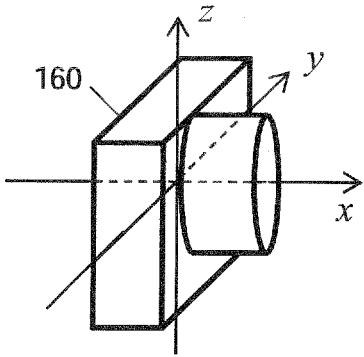
FIGS. 16A-16D are views illustrating movement of a camera.
Figure 16B:
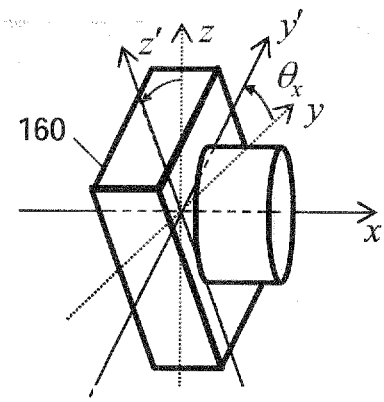
Figure 16C:
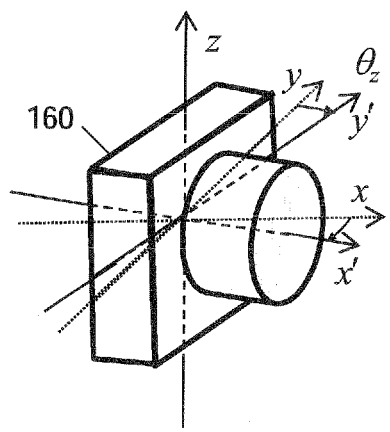
Figure 16D:
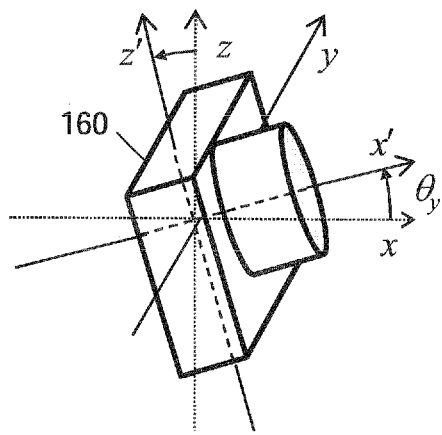

FIGS. 16A, 16B, 16C and 16D are views illustrating movement of a camera 160. Rotary direction movement of the camera 160 may be expressed by rotation about three axes, namely an x axis, a y axis, and a z axis. The x axis is an axis of an optical axis direction of the camera 160. The y axis is an axis of a perpendicular direction to the x axis in a horizontal plane. The z axis is an axis of a perpendicular direction to an xy plane. Using the state shown in FIG. 16A as a reference, rotation about the x axis will be referred to as roll (FIG. 16B), rotation about the z axis will be referred to as yaw (FIG. 16C), and rotation about the y axis will be referred to as pitch (FIG. 16D). During normal camera photography, yawing and pitching are dominant, whereas the effect of rolling is comparatively small. Therefore, the filter kernel is generated on the basis of the yaw and the pitch.

FIGS. 17A and 17B are views showing a relationship between a shake angle of the camera and image blur. FIG. 17A shows a state in which camera shaking does not occur, and FIG. 17B shows a state in which pitching occurs at a rotation angle $\theta_y$. If a distance from a lens 170 to an imaging device 171 is assumed to be substantially equal to a focal length f of the lens 170 and the size of the imaging device per pixel is set at c [mm], an image blur amount $d_y$ is expressed by a following Equation (8).

$$d_y = \frac{f}{c} \cdot \tan\theta_y \qquad (8)$$

An image blur amount $d_x$ when yawing occurs at a rotation angle $\theta_z$ is expressed similarly using a following Equation (9).

$$d_x = \frac{f}{c} \cdot \tan\theta_z \qquad (9)$$

A method of determining the filter kernel on the basis of the image blur amounts $d_x$, $d_y$ will now be described using FIGS. 18A and 18B. It is assumed that in a small amount of time during the photography, blur performs a linear uniform motion. A vector 180 is determined from the image blur amount $d_x$ in the x axis direction and the image blur amount $d_y$ in the y axis direction (see FIG. 18A). Using this vector 180, a directional smoothing filter of a kernel corresponding to the length of the vector is generated in the direction of the vector 180 (see FIG. 18B). Here also, the filter factors are all assumed to be identical in the direction of the vector 180.

Hence, assuming that the photographer performs panning such that the object is approximately in the center of the image, a follow shot image can be generated while correcting minute positional deviation of the object through image processing. In the filter kernel generation processing, an inter-image motion vector determined through image processing is used in the first embodiment, whereas in the second embodiment, the output of the angular velocity sensor 11 is used. Therefore, the processing can be performed with stability even in scenes where image processing-based positioning methods are in appropriate, such as cases where low contrast or a repeated pattern exists.

Hence, with the image processing apparatus according to the second embodiment, the movement of a camera that obtains a plurality of images is detected, and the filter kernel is determined on the basis of the detected camera movement and the focal length. As a result, a natural synthesized image corresponding to the camera movement and the imaging parameters can be generated appropriately.

Third Embodiment

In the image processing apparatus according to the first embodiment, filter processing is performed on the synthesized image. In an image processing apparatus according to a third embodiment, synthesis processing is performed after performing filter processing on the plurality of images. In so doing, the degree of smoothing can be varied for each image, and as a result, an image having a smoother background can be obtained.

Figure 19:
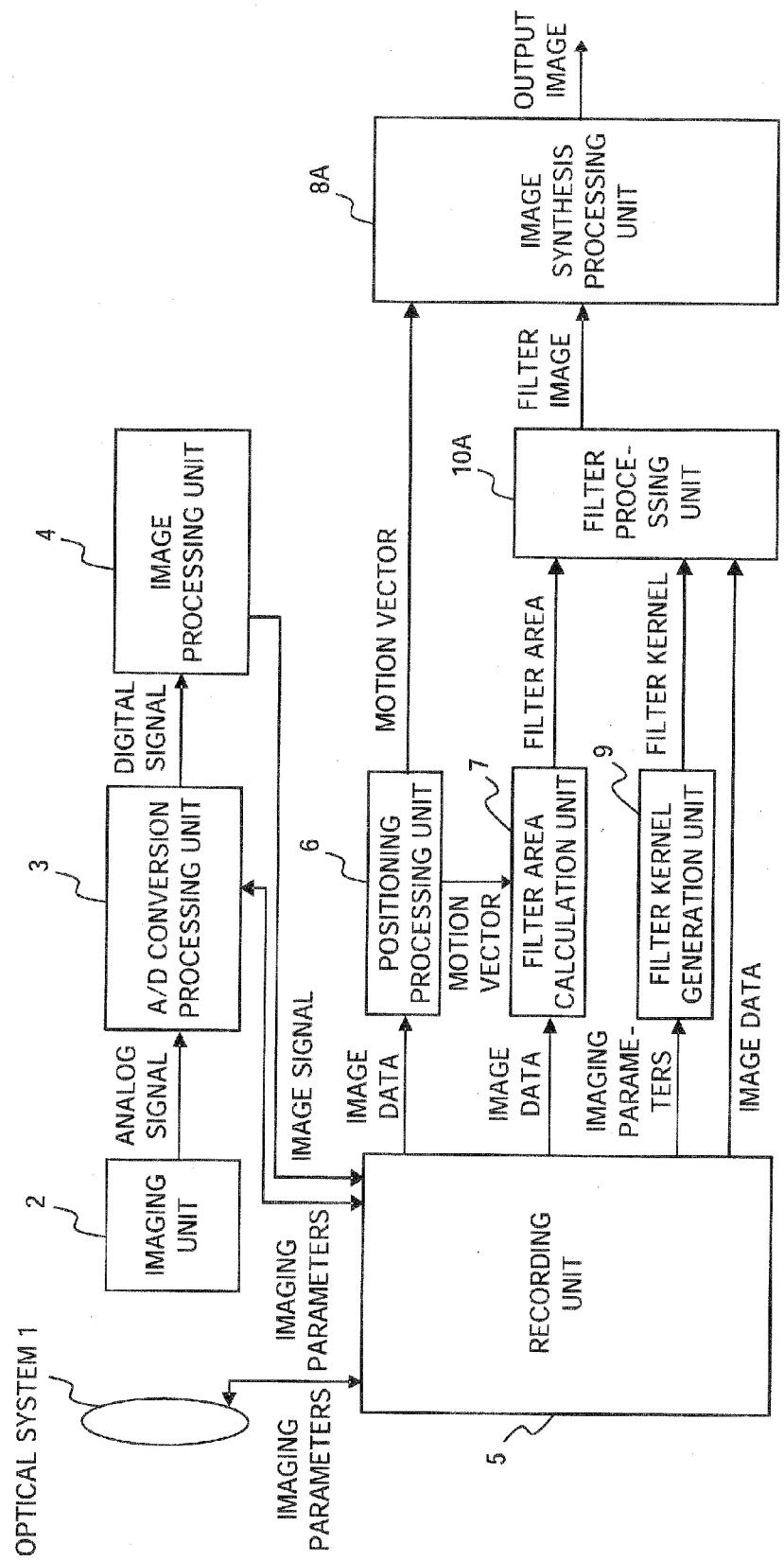
FIG. 19 is a view showing the constitution of an image processing apparatus according to a third embodiment.

FIG. 19 is a view showing the constitution of the image processing apparatus according to the third embodiment. This image processing apparatus differs from the image processing apparatus according to the first embodiment shown in FIG. 1 in the content of the processing performed by a filter processing unit 10A and an image synthesis processing unit 8A.

The filter processing unit 10A obtains filter images by performing filter processing on the basis of the data relating to the plurality of images recorded in the recording unit 5, the filter area determined by the filter area calculation unit 7, and the filter kernel generated by the filter kernel generation unit 9.

The image synthesis processing unit 8A obtains an output image by performing image synthesis while compensating for inter-image positional deviation on the basis of the plurality of filter images obtained in the filter processing performed by the filter processing unit 10A and the motion vector determined by the positioning processing unit 6.

Figure 20:
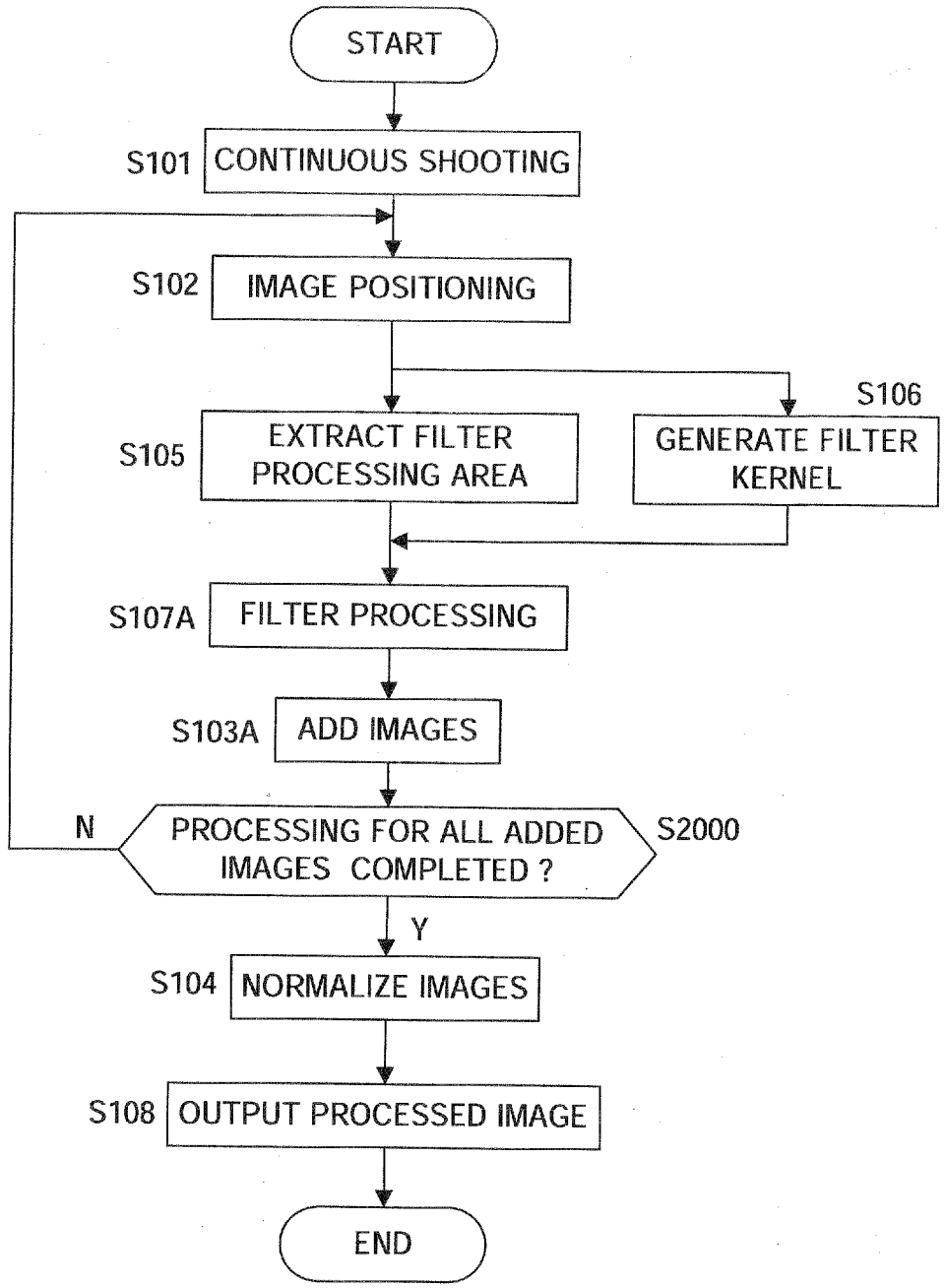
FIG. 20 is a flowchart showing an overall processing flow executed by the image processing apparatus according to the third embodiment.

FIG. 20 is a flowchart showing an overall processing flow performed by the image processing apparatus according to the third embodiment. Steps in which identical processing to the processing of the flowchart shown in FIG. 2 is performed have been allocated identical step numbers and detailed description thereof has been omitted.

In a step S107A, the filter processing unit 10A performs filter processing on the data relating to the plurality of images recorded in the recording unit 5 on the basis of the filter area obtained in the processing of the step S105 and the filter kernel obtained in the processing of the step S106. More specifically, smoothing processing is performed on the luminance values of the pixels in the filter area obtained in the processing of the step S105, from among the luminance values of the respective pixels constituting the images, using the filter kernel obtained in the processing of the step S106.

In a step S103A, the image synthesis processing unit 8A adds together the plurality of images while correcting positional deviation between the images on the basis of the images subjected to the filter processing and the motion vector determined in the step S102.

In a step S2000, a determination is made as to whether or not the processing up to the step S103A has been performed on all of the added images, or in other words all of the images used to generate the synthesized image. When it is determined that the processing up to the step S103A has not been performed on all of the added images, the routine returns to the step S102, where the processing up to the step S103A is performed on the unprocessed images. When it is determined that the processing up to the step S103A has been performed on all of the added images, on the other hand, the routine advances to the step S104.

In the step S104, the image synthesis processing unit 8A normalizes the added images by the addition count to obtain a synthesized image. In the step S108, the image synthesis processing unit 8A outputs the synthesized image obtained in the step S104.

In the first embodiment, filter processing is performed after image synthesis, but in the third embodiment, filter processing is implemented on the individual images, whereupon the plurality of filter-processed images are synthesized. Thus, the degree of smoothing can be varied in accordance with the positional deviation of each image, and as a result, an image having a smoother background can be obtained.

With the image processing apparatus according to the third embodiment, a motion vector between a plurality of images is determined, and a filter area for performing filter processing is extracted on the basis of the degree of inconsistency occurring when positional deviation between the plurality of images is corrected. Further, the filter kernel is determined on the basis of the imaging conditions, and filter processing based on the filter kernel is performed on the filter areas of the plurality of images. Positional deviation between the plurality of filter-processed images is then corrected on the basis of the determined motion vector, whereupon the plurality of images subjected to positional deviation correction are synthesized to generate a single synthesized image. As a result, a natural synthesized image corresponding to the imaging conditions can be generated. Furthermore, the degree of smoothing can be varied in accordance with the positional deviation of each image, and therefore an image having a smoother background can be obtained.

Fourth Embodiment

In the image processing apparatus according to the second embodiment, filter processing is performed on the synthesized image, but in an image processing apparatus according to a fourth embodiment, synthesis processing is performed after performing filter processing on the plurality of images. In so doing, the degree of smoothing can be varied for each image, and as a result, an image having a smoother background can be obtained. Further, in the image processing apparatus according to the third embodiment, the filter kernel is determined in accordance with the imaging parameters, but in the image processing apparatus according to the fourth embodiment, the filter kernel is determined in accordance with the output of an angular velocity sensor and the imaging parameters.

Figure 21:
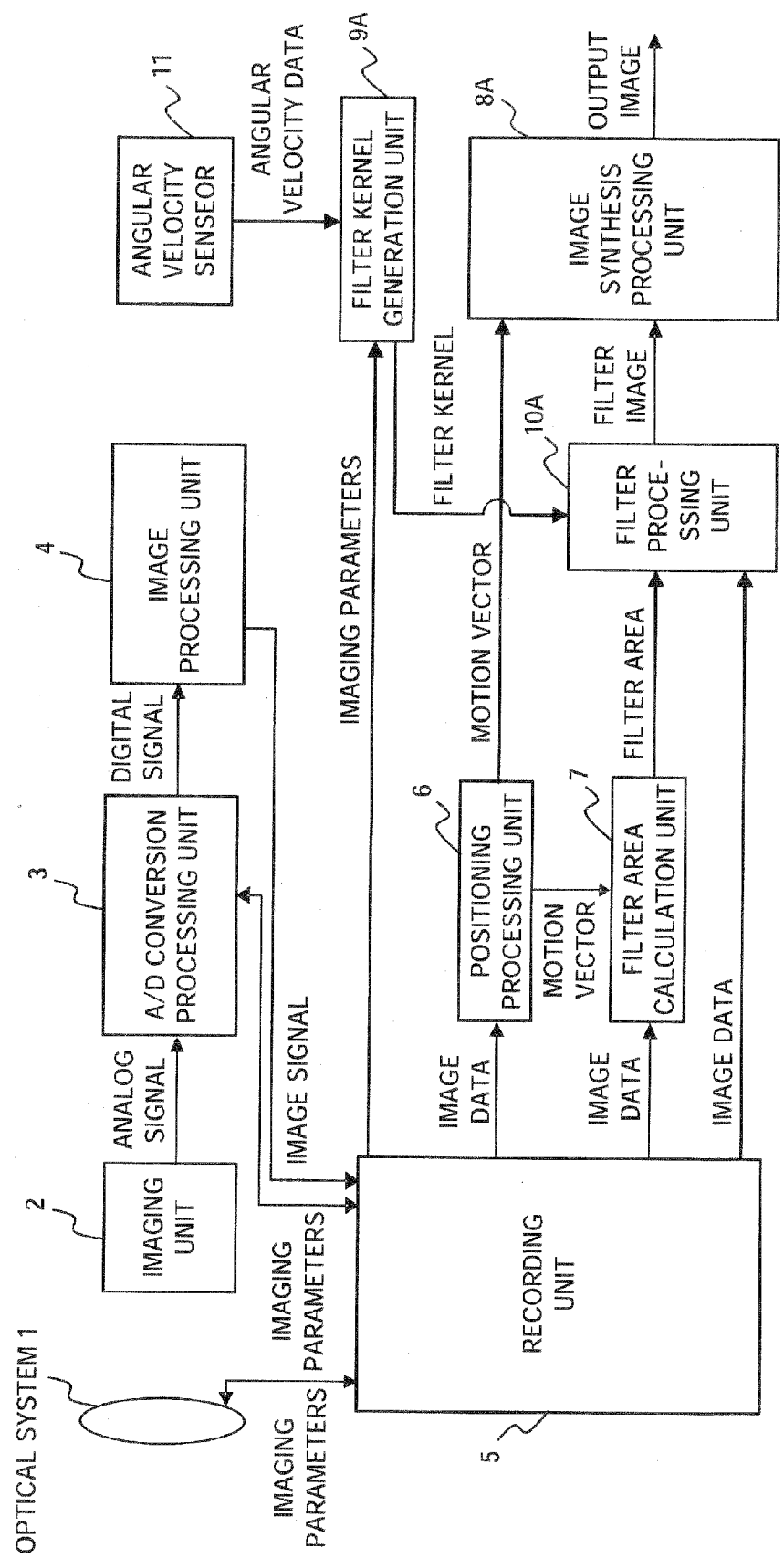
FIG. 21 is a view showing the constitution of an image processing apparatus according to a fourth embodiment.

FIG. 21 is a view showing the constitution of the image processing apparatus according to the fourth embodiment. This image processing apparatus differs from the image processing apparatus according to the third embodiment shown in FIG. 19 in the addition of the angular velocity sensor 11 and the method of generating the filter kernel employed by the filter kernel generation unit 9A.

The angular velocity sensor 11 measures the amount of camera shake during photography and outputs the measured amount as angular velocity data. The filter kernel generation unit 9A generates the filter kernel on the basis of the angular velocity data and the imaging parameters.

An overall processing flow performed by the image processing apparatus according to the fourth embodiment is identical to that of the flowchart shown in FIG. 20 except for the processing of the step S106, i.e. the processing content of the processing for generating the filter kernel. However, the content of the filter kernel generation processing according to the fourth embodiment is identical to the content of the filter kernel generation processing according to the second embodiment, and therefore detailed description has been omitted here.

With the image processing apparatus according to the fourth embodiment, the movement of a camera that obtains a plurality of images is detected, and the filter kernel is determined on the basis of the detected camera movement and the focal length. As a result, a natural synthesized image corresponding to the camera movement and the imaging parameters can be generated appropriately. Further, positional deviation between the plurality of filter-processed images is corrected, whereupon the plurality of images subjected to positional deviation correction are synthesized to generate a single synthesized image. As a result, the degree of smoothing can be varied in accordance with the positional deviation of each image, and therefore an image having a smoother background can be obtained.

Fifth Embodiment

In the image processing apparatus according to the first embodiment, filter processing is performed on the synthesized image obtained by synthesizing the plurality of images. In an image processing apparatus according to a fifth embodiment, the synthesis processing is not performed, and instead, filter processing is performed on a single image using a filter kernel that corresponds to the imaging parameters, whereupon the filter-processed image is output as a follow shot image. As a result, a follow shot image can be obtained more easily.

Figure 22:
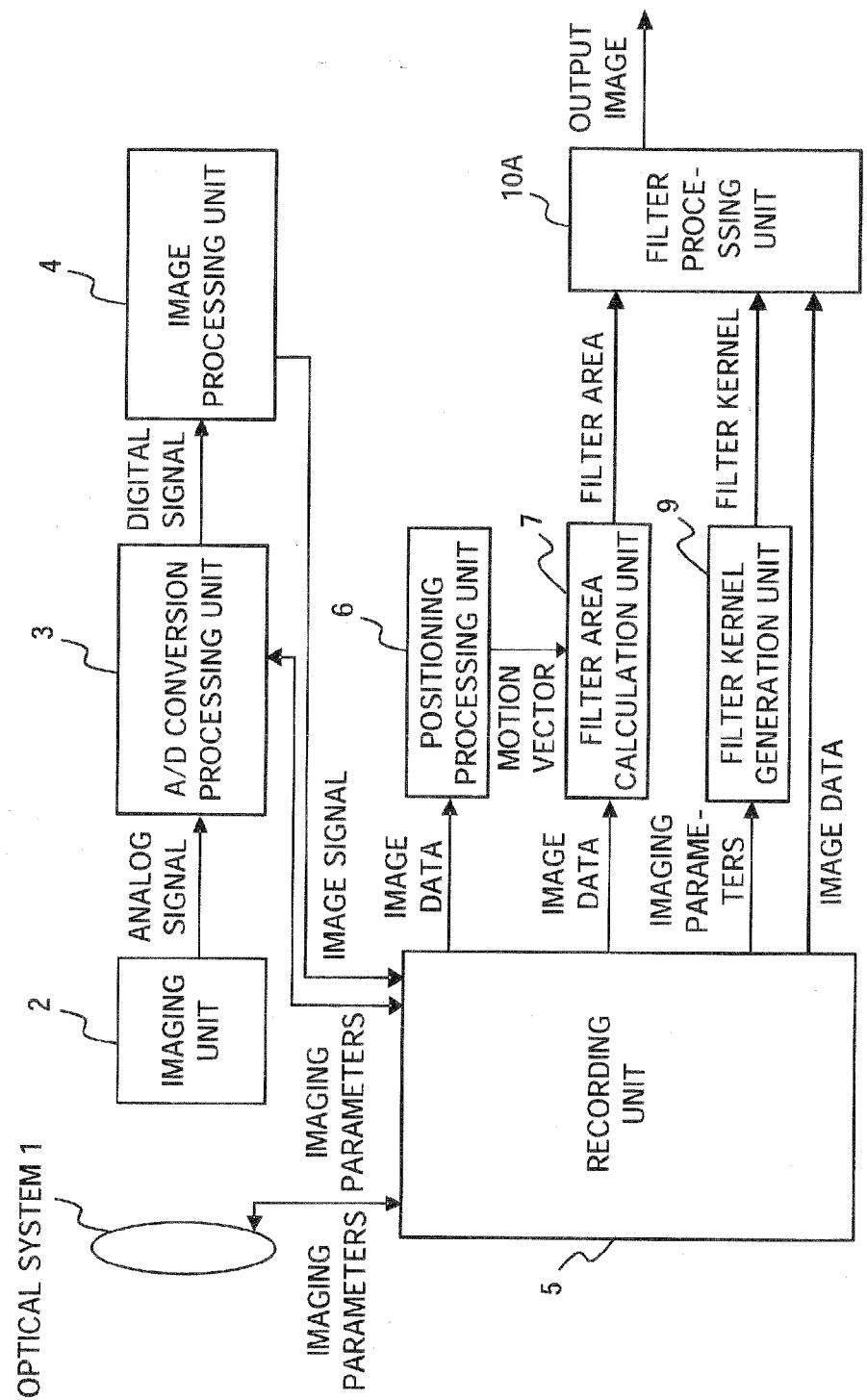
FIG. 22 is a view showing the constitution of an image processing apparatus according to a fifth embodiment.

FIG. 22 is a view showing the constitution of the image processing apparatus according to the fifth embodiment. The filter processing unit 10A obtains an output image by performing filter processing on the basis of an image recorded in the recording unit 5, the filter area determined by the filter area calculation unit 7, and the filter kernel generated by the filter kernel generation unit 9.

Figure 23:
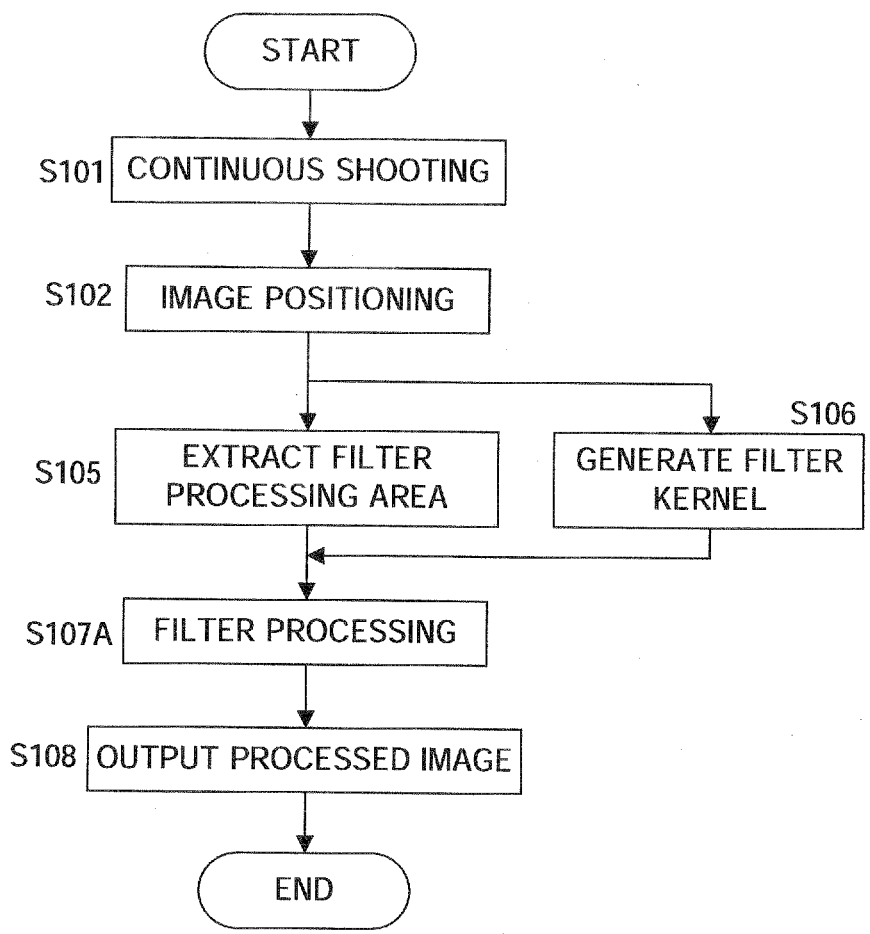
FIG. 23 is a flowchart showing the content of the processing performed by the image processing apparatus according to the fifth embodiment.

FIG. 23 is a flowchart showing the content of the processing performed by the image processing apparatus according to the fifth embodiment. Steps in which identical processing to the processing of the flowchart shown in FIG. 2 is performed have been allocated identical step numbers and detailed description thereof has been omitted.

In the step S107A, the filter processing unit 10A performs filter processing on the data of a single image recorded in the recording unit 5 on the basis of the filter area obtained in the processing of the step S105 and the filter kernel obtained in the processing of the step S106. More specifically, smoothing processing is performed on the luminance values of the pixels in the filter area obtained in the processing of the step S105, from among the luminance values of the respective pixels constituting the image, using the filter kernel obtained in the processing of the step S106.

In the step S108, the filter processing unit 10A outputs the image subjected to filter processing in the step S107A as a follow shot image.

With the image processing apparatus according to the fifth embodiment, a motion vector between a plurality of images is determined, and a filter area for performing filter processing is extracted on the basis of the degree of inconsistency occurring when positioning is performed between the plurality of images on the basis of the motion vector. Further, the filter kernel is determined on the basis of the imaging conditions, and filter processing based on the filter kernel is performed on the extracted filter area, from among the respective areas of the image. Hence, a follow shot image in which filter processing has been implemented on the positioning inconsistency area of the background part can be obtained easily, without the need to add together images.

Modified Example of Fifth Embodiment

A modified example of the image processing apparatus according to the fifth embodiment will now be described. In the fifth embodiment described above, a follow shot effect is generated easily by performing directional smoothing filter processing on the background part, i.e. the part other than the main object. However, by performing filter processing using an isotropic smoothing filter, an image in which the depth of field of the background is made to appear shallow can be obtained.

Figures 24A, 24B, 25:
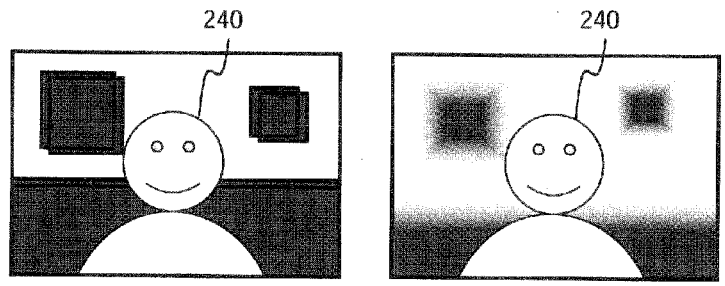
FIG. 24A is a view showing an image prior to filter processing.
FIG. 24B is a view showing an image in which filter processing using an isotropic smoothing filter has been implemented on a background part other than a person serving as a main object.
FIG. 25 shows an example of a table defining a relationship between the degree of blur D and the filter kernel.

FIG. 24A is a view showing an image prior to filter processing, and FIG. 24B is a view showing an image in which filter processing using an isotropic smoothing filter has been implemented on a background part other than a person 240 serving as a main object.

The filter kernel of the smoothing filter used in the filter processing is determined in accordance with the degree of blur D calculated from Equation (7). FIG. 25 shows an example of a table defining a relationship between the degree of blur D and the filter kernel. FIG. 25 defines relationships of the degree of blur D with a 5×5 isotropic filter kernel and a 3×3 isotropic filter kernel.

For example, when the degree of blur D is 10 [pixels], filter processing is performed twice, once using the 5×5 isotropic smoothing filter and once using the 3×3 isotropic smoothing filter. Further, when the degree of blur D is 15 [pixels], filter processing is performed using the 3×3 isotropic smoothing filter twice.

Hence, filter processing is performed by preparing a table such as that shown in FIG. 25 in advance and determining the type of smoothing filter to be used in the filter processing and the number of applications in accordance with the degree of blur D calculated from Equation (7). It should be noted that the table shown in FIG. 25 is an example, and the types of smoothing filters and numbers of applications corresponding to the degree of blur D are not limited to the values shown in FIG. 25.

Thus, the degree of background blur can be varied in accordance with the imaging condition, and the depth of field can be changed artificially following image pickup.

Sixth Embodiment

In the image processing apparatus according to the second embodiment, filter processing is performed on the synthesized image obtained by synthesizing the plurality of images. In an image processing apparatus according to a sixth embodiment, synthesis processing is not performed, and instead, filter processing is performed on a single image using a filter kernel that corresponds to the imaging parameters, whereupon the filter-processed image is output as a follow shot image. Further, similarly to the image processing apparatus according to the second embodiment, the filter kernel is determined in accordance with the output of the angular velocity sensor 11 and the imaging parameters. Therefore, a follow shot image can be obtained more easily than with the image processing apparatus according to the second embodiment.

Figure 26:
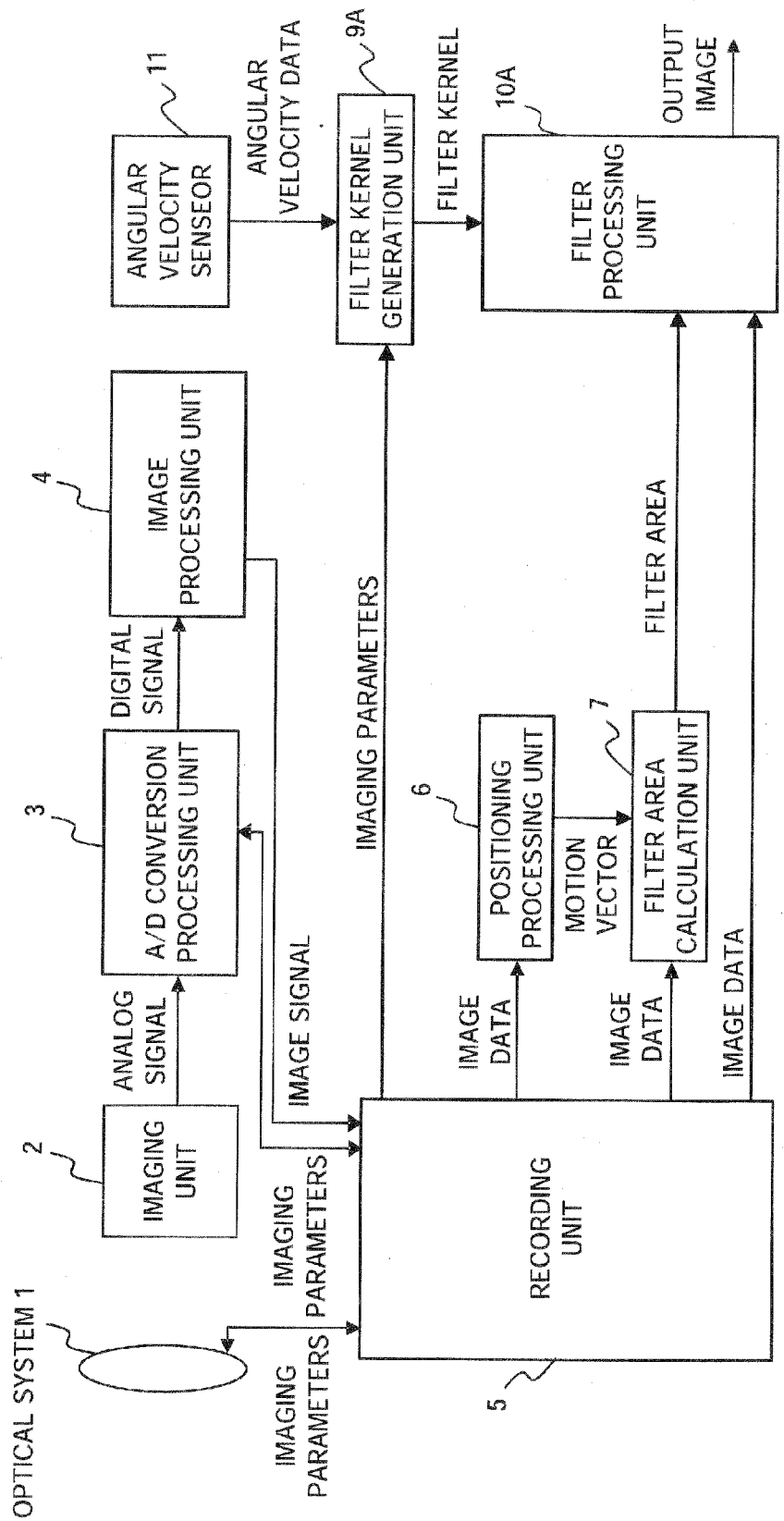
FIG. 26 is a view showing the constitution of an image processing apparatus according to a sixth embodiment.

FIG. 26 is a view showing the constitution of the image processing apparatus according to the sixth embodiment. This image processing apparatus differs from the image processing apparatus according to the fifth embodiment shown in FIG. 22 in the addition of the angular velocity sensor 11 and the method of generating the filter kernel employed by the filter kernel generation unit 9A.

The angular velocity sensor 11 measures the amount of camera shake during photography and outputs the measured amount as angular velocity data. The filter kernel generation unit 9A generates the filter kernel on the basis of the angular velocity data and the imaging parameters. The filter processing unit 10A obtains an output image by performing filter processing on the basis of an image recorded in the recording unit 5, the filter area determined by the filter area calculation unit 7, and the filter kernel.

The content of the processing performed by the image processing apparatus according to the sixth embodiment is identical to that of the flowchart shown in FIG. 23 except for the processing of the step S106, i.e. the processing content of the processing for generating the filter kernel. However, the content of the filter kernel generation processing according to the sixth embodiment is identical to the content of the filter kernel generation processing according to the second embodiment, and therefore detailed description has been omitted here.

With the image processing apparatus according to the sixth embodiment, similarly to the image processing apparatus according to the fifth embodiment, a follow shot image can be generated easily by performing filter processing on a single image. Further, the filter processing is performed after determining the filter kernel on the basis of the camera movement and the focal length, and therefore a natural synthesized image corresponding to the camera movement and the imaging parameters can be generated appropriately.

In the above description of the first to sixth embodiments, it is assumed that the processing performed by the image processing apparatus is hardware processing, but this invention need not be limited to such a constitution. For example, a constitution in which the processing is performed by software may be employed. In this case, the image processing apparatus includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image processing apparatus described above is realized.

Here, a computer-readable storage medium denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

This invention is not limited to the first to sixth embodiments described above, and may be subjected to various modifications and applications within a scope that does not depart from the spirit of the invention. For example, during motion vector calculation, the template block 21 set in the positioning subject frame 26 is scanned in the search area 22 of the reference frame 27 (see FIGS. 3A, 3B), but instead, a template block may be set in the reference frame and matching processing may be performed in relation to the template block in a search area of the positioning subject frame.

The filter processing unit 10, 10A performs filter processing using a directional smoothing filter to obtain a follow shot image or performs filter processing using an isotropic smoothing filter to obtain an image having a shallow depth of field. However, filter processing using another filter may be performed.

Further, in the second, fourth and sixth embodiments, camera movement is detected using the angular velocity sensor 11, but camera movement may be detected using another sensor or another method.

FIG. 12B shows an example of the filter kernel of the smoothing filter used in the filter processing, but the filter kernel is not limited to the example shown in FIG. 12B.

This application claims priority based on JP2009-31872, filed with the Japan Patent Office on Feb. 13, 2009, the entire contents of which are incorporated into this specification by reference.

What is claimed is:

1. An electronic device for correcting a positional deviation between a plurality of images obtained in time series and performing synthesis processing on the plurality of corrected images, the electronic device comprising:
   a motion vector determination unit that determines a motion vector between the plurality of images;
   an image synthesis unit that corrects the positional deviation between the plurality of images based on the determined motion vector and generates a synthesized image by synthesizing the plurality of images subjected to the positional deviation correction;
   a filter area extraction unit that extracts a filter area in which filter processing is to be performed based on a degree of inconsistency occurring when the positional deviation between the plurality of images is corrected;
   a filter kernel determination unit that determines a filter kernel based on an imaging condition of an image pickup device; and
   a filter processing unit that performs filter processing based on the filter kernel on the extracted filter area of the synthesized image;
wherein the filter kernel determination unit determines a degree of blur by obtaining values of a focal length, an F value, an object distance, and a background distance upon acquisition of the plurality of images, and determines the filter kernel based on the determined degree of blur.

2. An electronic device for correcting a positional deviation between a plurality of images obtained in time series and performing synthesis processing on the plurality of corrected images, the electronic device comprising:
   a motion vector determination unit that determines a motion vector between the plurality of images;
   a filter area extraction unit that extracts filter areas in which filter processing is to be performed based on a degree of inconsistency occurring when the positional deviation between the plurality of images is corrected;
   a filter kernel determination unit that determines filter kernels based on an imaging condition of an image pickup device;
   a filter processing unit that performs filter processing based on the filter kernels on the extracted filter areas of the plurality of images; and
   an image synthesis unit that corrects the positional deviation between the plurality of images subjected to the filter processing based on the determined motion vector, and generates a synthesized image by synthesizing the plurality of images subjected to the positional deviation correction;
wherein the filter kernel determination unit determines a degree of blur by obtaining values of a focal length, an F value, an object distance, and a background distance upon acquisition of the plurality of images, and determines the filter kernels based on the determined degree of blur.

3. The electronic device as defined in claim 1, wherein the filter processing unit performs smoothing filter processing as the filter processing.

4. The electronic device as defined in claim 2, wherein the filter processing unit performs smoothing filter processing as the filter processing.

5. An electronic device comprising:
   a motion vector determination unit that determines a motion vector between a plurality of images;
   a filter area extraction unit that extracts a filter area in which filter processing is to be performed based on a degree of inconsistency occurring when positioning is performed between the plurality of images in accordance with the motion vector;
   a filter kernel determination unit that determines a filter kernel based on an imaging condition of an image pickup device; and
   a filter processing unit that performs filter processing based on the filter kernel on an area corresponding to the extracted filter area of a single image;
wherein the filter kernel determination unit determines a degree of blur by obtaining values of a focal length, an F value, an object distance, and a background distance upon acquisition of the plurality of images, and determines the filter kernel based on the determined degree of blur.

6. The electronic device as defined in claim 5, wherein the filter kernel determination unit determines the filter kernel of an isotropic smoothing filter.

7. The electronic device as defined in claim 5, wherein the filter kernel determination unit determines the filter kernel of a directional smoothing filter.

8. An image processing method for correcting a positional deviation between a plurality of images obtained in time series and performing synthesis processing on the plurality of corrected images, the method comprising:
   determining a motion vector between the plurality of images;
   correcting the positional deviation between the plurality of images based on the determined motion vector and generating a synthesized image by synthesizing the plurality of images subjected to the positional deviation correction;
   extracting a filter area in which filter processing is to be performed based on a degree of inconsistency occurring when the positional deviation between the plurality of images is corrected;
   determining a degree of blur by obtaining values of a focal length, an F value, an object distance, and a background distance upon acquisition of the plurality of images;
   determining a filter kernel based on the determined degree of blur; and
   performing filter processing based on the filter kernel on the extracted filter area of the synthesized image.

9. An image processing method for correcting a positional deviation between a plurality of images obtained in time series and performing synthesis processing on the plurality of corrected images, the method comprising:
   determining a motion vector between the plurality of images;
   extracting filter areas in which filter processing is to be performed based on a degree of inconsistency occurring when the positional deviation between the plurality of images is corrected;
   determining a degree of blur by obtaining values of a focal length, an F value, an object distance, and a background distance upon acquisition of the plurality of images;
   determining filter kernels based on the determined degree of blur;
   performing filter processing based on the filter kernels on the extracted filter areas of the plurality of images; and
   correcting the positional deviation between the plurality of images subjected to the filter processing based on the determined motion vector, and generating a synthesized image by synthesizing the plurality of images subjected to the positional deviation correction.

10. An image processing method comprising:
    determining a motion vector between a plurality of images;
    extracting a filter area in which filter processing is to be performed based on a degree of inconsistency occurring when positioning is performed between the plurality of images in accordance with the motion vector;
    determining a degree of blur by obtaining values of a focal length, an F value, an object distance, and a background distance upon acquisition of the plurality of images;
    determining a filter kernel based on the determined degree of blur; and
    performing filter processing based on the filter kernel on an area corresponding to the extracted filter area of a single image.

11. A recording device storing an image processing program for correcting a positional deviation between a plurality of images obtained in time series and for performing synthesis processing on the plurality of corrected images, wherein the image processing program causes a computer to perform functions comprising:
    determining a motion vector between the plurality of images;
    correcting the positional deviation between the plurality of images based on the determined motion vector and generating a synthesized image by synthesizing the plurality of images subjected to the positional deviation correction;
    extracting a filter area in which filter processing is to be performed based on a degree of inconsistency occurring when the positional deviation between the plurality of images is corrected;
    determining a degree of blur by obtaining values of a focal length, an F value, an object distance, and a background distance upon acquisition of the plurality of images;
    determining a filter kernel based on the determined degree of blur; and
    performing filter processing based on the filter kernel on the extracted filter area of the synthesized image.

12. A recording device storing an image processing program for correcting a positional deviation between a plurality of images obtained in time series and for performing synthesis processing on the plurality of corrected images, wherein the image processing program causes a computer to perform functions comprising:
    determining a motion vector between the plurality of images;
    extracting filter areas in which filter processing is to be performed based on a degree of inconsistency occurring when the positional deviation between the plurality of images is corrected;
    determining a degree of blur by obtaining values of a focal length, an F value, an object distance, and a background distance upon acquisition of the plurality of images;
    determining filter kernels based on the determined degree of blur;
    performing filter processing based on the filter kernels on the extracted filter areas of the plurality of images; and
    correcting the positional deviation between the plurality of images subjected to the filter processing based on the determined motion vector, and generating a synthesized image by synthesizing the plurality of images subjected to the positional deviation correction.

13. A recording device storing an image processing program, wherein the image processing program causes a computer to perform functions comprising:
    determining a motion vector between a plurality of images;
    extracting a filter area in which filter processing is to be performed based on a degree of inconsistency occurring when positioning is performed between the plurality of images in accordance with the motion vector;
    determining a degree of blur by obtaining values of a focal length, an F value, an object distance, and a background distance upon acquisition of the plurality of images;
    determining a filter kernel based on the determined degree of blur; and
    performing filter processing based on the filter kernel on an area corresponding to the extracted filter area of a single image.

* * * * *